US012209455B2

(12) United States Patent
Iles et al.

(10) Patent No.: US 12,209,455 B2
(45) Date of Patent: Jan. 28, 2025

(54) REDUCED VISIBILITY WINDOW/DOOR SCREEN INCLUDING A REDUCED FRAME PROFILE AND METHOD OF MAKING SAME

(71) Applicant: THE RITESCREEN COMPANY, LLC, Elizabethville, PA (US)

(72) Inventors: Thomas Randall Iles, State College, PA (US); John C. St. Clair, Ashville, PA (US); John Joseph Keller, Newtown, PA (US); John France, Mantua, OH (US); Christopher Seebode, Basking Ridge, NJ (US)

(73) Assignee: The Ritescreen Company, LLC, Elizabethville, PA (US)

( * ) Notice: Subject to any disclaimer, the term of this patent is extended or adjusted under 35 U.S.C. 154(b) by 168 days.

(21) Appl. No.: 17/356,688

(22) Filed: Jun. 24, 2021

(65) Prior Publication Data

US 2021/0388674 A1 Dec. 16, 2021

Related U.S. Application Data

(63) Continuation of application No. 15/850,159, filed on Dec. 21, 2017, now Pat. No. 11,125,012.

(Continued)

(51) Int. Cl.
*E06B 9/52* (2006.01)

(52) U.S. Cl.
CPC .......... *E06B 9/52* (2013.01); *E06B 2009/527* (2013.01)

(58) Field of Classification Search
CPC ................. E06B 9/52; E06B 2009/527; E06B 2009/528; E06B 9/521; A47G 5/00; F16F 1/18; F16F 1/185; F16F 1/187; F16F 1/26
See application file for complete search history.

(56) References Cited

U.S. PATENT DOCUMENTS

| | | | |
|---|---|---|---|
| 78,541 | A | 7/1868 | McCluskey |
| 246,153 | A | 8/1881 | Koch |

(Continued)

OTHER PUBLICATIONS

Types of Glue and Glue Tips, available Sep. 2, 2014, accessed Oct. 23, 2017 from https://adhesives.org/adhesives-sealants/adhesive-selection/types-of-glue-glue-tips (Year: 2014).*

*Primary Examiner* — Abe Massad
*Assistant Examiner* — Jeremy C Ramsey
(74) *Attorney, Agent, or Firm* — Thomas A. O'Rourke; James Bongiorno; O'ROURKE IP LAW, PLLC

(57) ABSTRACT

A reduced, visibility window/door screen includes a particularly formed narrow profile frame and mesh applied to the frame. The frame is formed from a single elongated member that is bent to form four corners and four corresponding sides, with joining of the adjacent first and second ends. A high-strength adhesive bonds the mesh to the frame, which is pinch rolled thereon for exceptional pull-out strength. Another embodiment includes a leaf spring movably secured to the frame, to bias and center the screen within the master frame. Another embodiment further includes a plunger pin slidably disposed in the frame with one end fixedly secured to the leaf spring, and handle movably connected to the other end of the plunger pin. The handle member being movable between first and second positions to respectively actuate the leaf spring between an undeformed condition, and a deformed, flattened condition permitting installation/removal of the screen.

11 Claims, 24 Drawing Sheets

Related U.S. Application Data

(60) Provisional application No. 62/473,764, filed on Mar. 20, 2017, provisional application No. 62/473,749, filed on Mar. 20, 2017, provisional application No. 62/440,463, filed on Dec. 30, 2016.

(56) References Cited

U.S. PATENT DOCUMENTS 266,246 A 11/1882 Willer
268,491 A 12/1882 Hubbell
514,654 A 2/1894 Higgin
690,662 A 1/1902 Perrin
724,682 A 4/1903 Eastman
792,833 A 6/1905 Lee
1,010,700 A 12/1911 Steger
1,025,256 A 5/1912 Faber
1,038,367 A 9/1912 Henry
1,042,380 A 10/1912 Baker
1,047,828 A 12/1912 Morgner
1,058,616 A 4/1913 Maze
1,135,352 A 4/1915 Bunger
1,178,219 A 4/1916 Gramer
1,187,402 A 6/1916 Traut
1,260,589 A 3/1918 Steger
1,423,021 A 7/1922 Reynolds
1,436,858 A 11/1922 Burhen
1,653,184 A 12/1927 Kolumbus
1,678,941 A 7/1928 Helman
1,697,768 A 1/1929 King
1,733,877 A 10/1929 Higgin
1,736,688 A 11/1929 Yerby
1,745,818 A 2/1930 Trombly
1,760,612 A 5/1930 Trott
1,794,956 A 3/1931 Heath
1,807,425 A 5/1931 McCalmon
1,824,897 A 9/1931 Johnson
1,856,323 A 5/1932 Feaster
1,879,377 A 9/1932 McNeely
1,943,868 A * 1/1934 Johnson .................... E06B 9/52
49/459
1,947,307 A 2/1934 Rafton
1,959,136 A 5/1934 Miller
1,977,165 A 10/1934 Williams
1,997,713 A 4/1935 Boehm
1,997,740 A 4/1935 Nickerson
2,052,467 A 8/1936 Hermann
2,079,718 A 5/1937 Sgritta
2,082,513 A 6/1937 Roberts
2,126,544 A 8/1938 Everhard
2,204,761 A 3/1939 Lang
2,197,489 A 4/1940 Trulock
2,265,375 A 12/1941 Julien
2,274,700 A 3/1942 Jenks
2,297,729 A 10/1942 Thomas
2,388,044 A * 10/1945 Drab ..................... E06B 3/2605
49/63
2,444,288 A 6/1948 Gilson
2,511,239 A 6/1950 Behnke
2,523,383 A 9/1950 Majkrzak
2,532,886 A 12/1950 Bianchi
2,537,109 A 1/1951 Willett
2,598,770 A 6/1952 Drozt
2,612,947 A 10/1952 Jenks
2,619,168 A 11/1952 Leverence
2,625,217 A 1/1953 Spiller
2,670,079 A 2/1954 Betts
2,695,664 A 11/1954 Delegard
2,702,596 A 2/1955 Morrow
2,720,950 A 10/1955 Rick
2,722,978 A 11/1955 Frisk
2,723,032 A 11/1955 Gisler
2,759,538 A 8/1956 Long
2,774,477 A 12/1956 Pollitz
2,797,750 A 7/1957 Van Dette
2,835,325 A 5/1958 Gilbert
2,870,882 A * 1/1959 Tolman ................. E06B 3/9685
160/90
2,897,889 A 8/1959 Kessler
2,902,165 A 9/1959 Imershein
2,914,123 A 11/1959 Deuble
2,989,788 A 6/1961 Kessler
3,002,557 A 10/1961 Roth
3,057,401 A 10/1962 Gomory
3,107,991 A 10/1963 Taussig
3,176,843 A 4/1965 Hoskins
3,220,469 A 11/1965 Oehmig
3,255,810 A 6/1966 Rowbattam
3,276,513 A 10/1966 Lemelson
3,321,885 A 5/1967 Pratt
3,341,013 A 9/1967 Moulton
3,374,597 A 3/1968 Whitener
3,455,367 A 7/1969 Tarte
3,477,574 A 11/1969 Malfroy
3,679,057 A 7/1972 Perez
3,716,138 A 2/1973 Lumsden
3,760,860 A 9/1973 Kelarakis
4,033,865 A 7/1977 Derrick
4,232,310 A 11/1980 Wilson
4,311,183 A 1/1982 Herbst
4,502,260 A 3/1985 Machler
4,568,455 A 2/1986 Huber
4,570,406 A 2/1986 DiFazio
4,968,366 A 11/1990 Hukki
5,032,210 A 7/1991 Hukki
5,039,246 A 8/1991 Woodruff
5,046,546 A 9/1991 Benedyk
5,090,469 A 2/1992 Boulanger
5,137,622 A 8/1992 Souter
5,469,906 A 11/1995 Cason
5,540,019 A 7/1996 Beske
5,547,011 A 8/1996 Dotson
5,594,418 A 1/1997 Martin
5,666,773 A 9/1997 Librande
5,718,791 A 2/1998 Spengler
5,775,400 A 7/1998 Wilkinson
5,787,657 A 8/1998 Librande
5,794,328 A 8/1998 Simone
5,794,528 A 8/1998 Gronig
5,797,223 A 8/1998 Shoup
5,851,393 A 12/1998 Carr
6,073,675 A 6/2000 Dannaher
6,108,997 A 8/2000 Blais
6,276,426 B1 8/2001 Polak
6,279,644 B1 8/2001 Wylie
6,331,223 B1 12/2001 Wylie
6,450,345 B1 9/2002 Adams
6,565,698 B1 5/2003 Adams
6,669,985 B2 12/2003 Adams
6,736,270 B2 5/2004 Adams
6,742,565 B2 6/2004 Badley
6,779,580 B2 * 8/2004 Woodward ................ E06B 9/52
160/90
6,977,021 B2 12/2005 Annacchino
6,991,693 B2 1/2006 Wylie
7,007,735 B1 3/2006 Lake
7,740,048 B2 6/2010 Wilson
7,861,473 B1 1/2011 Green
8,042,598 B2 10/2011 Bredemus
8,056,602 B1 11/2011 Green
8,191,606 B2 6/2012 Edlin
8,919,826 B2 12/2014 Small
D727,539 S 4/2015 Alexander
9,157,271 B2 10/2015 Burton
9,234,388 B2 1/2016 Altieri
D748,818 S 2/2016 Shen
D757,299 S 5/2016 Altieri
9,631,417 B2 4/2017 Massey
2002/0092632 A1 * 7/2002 Therrien ............... E06B 3/9647
160/381
2004/0140067 A1 7/2004 Kelley
2005/0056389 A1 3/2005 Kelley
2006/0048467 A1 3/2006 Martineau
2006/0054286 A1 3/2006 Woodward
2006/0231221 A1 10/2006 Chen

(56) References Cited

U.S. PATENT DOCUMENTS

| | | | | |
|---|---|---|---|---|
| 2014/0290160 | A1 | 10/2014 | Altieri | |
| 2014/0290880 | A1 | 10/2014 | Altieri | |
| 2016/0090780 | A1 * | 3/2016 | Altieri, Jr. | E06B 9/0692 29/426.6 |

* cited by examiner

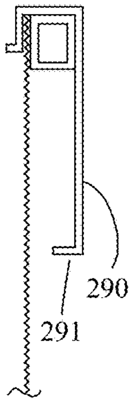
FIG. 10
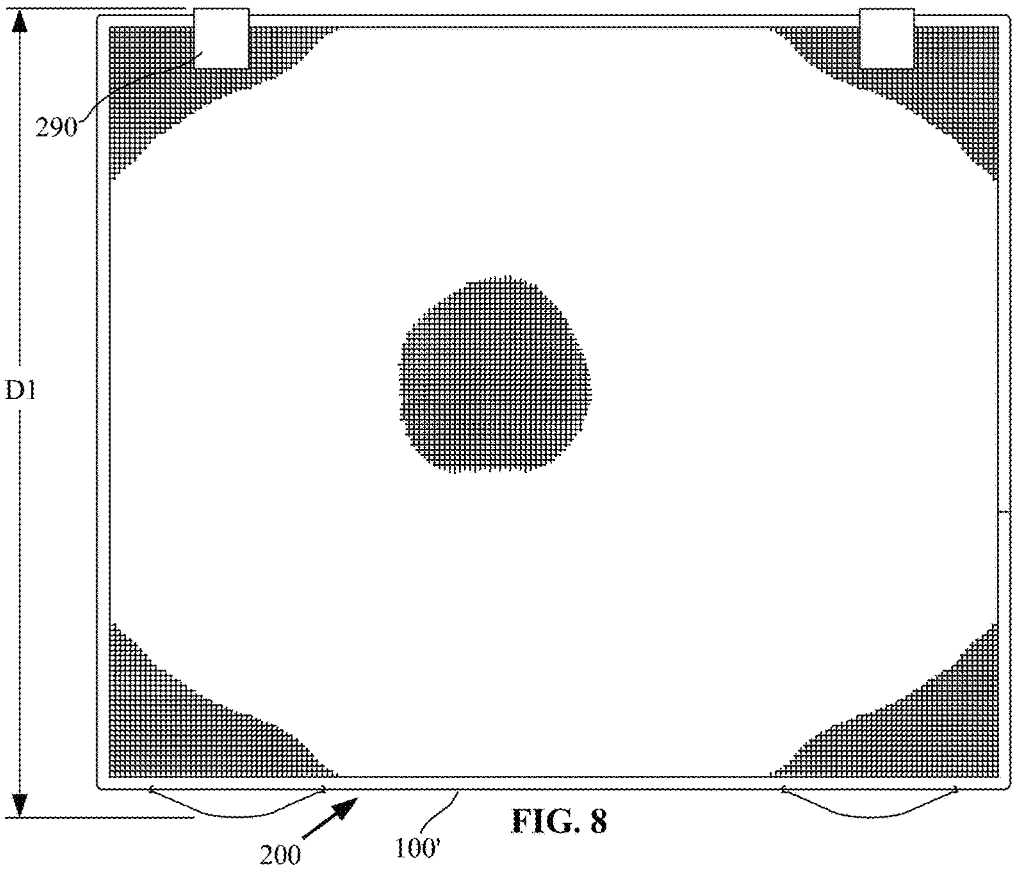
FIG. 8
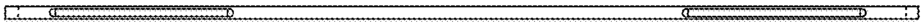
FIG. 9
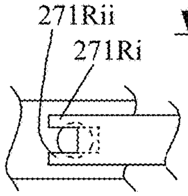
FIG. 9A
FIG. 11
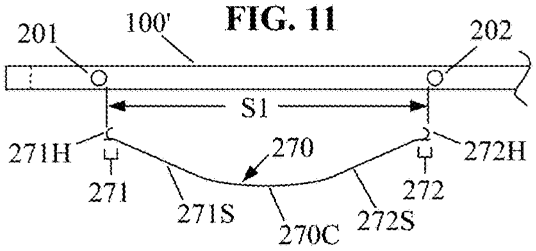
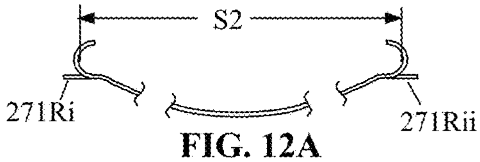
FIG. 12A
FIG. 12B
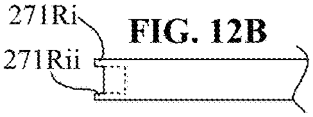
FIG. 13A
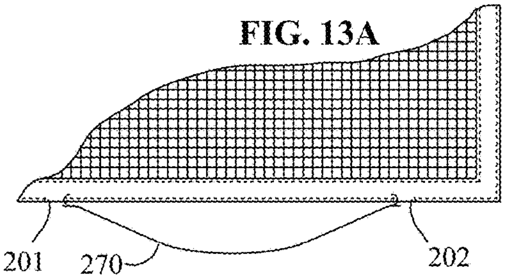
FIG. 13B
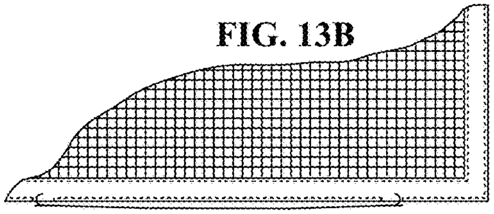

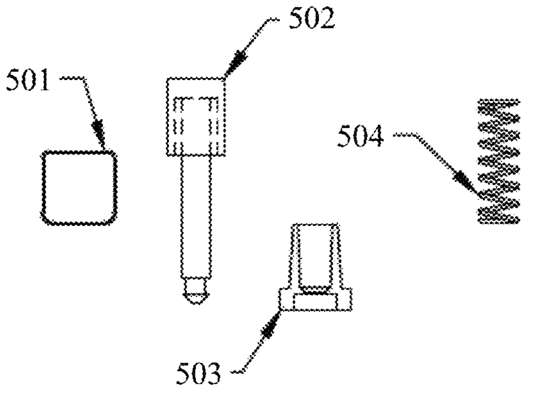
FIG. 25
FIG. 28
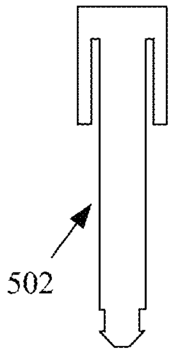
FIG. 26
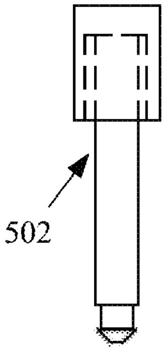
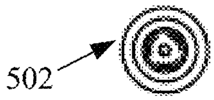
FIG. 27
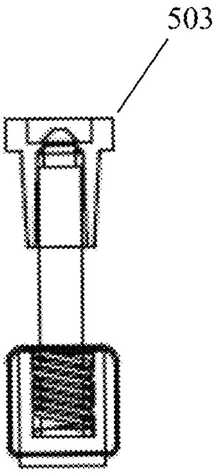
FIG. 30
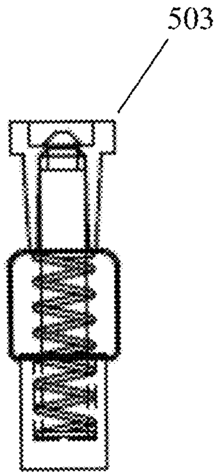
FIG. 29

FIG. 31
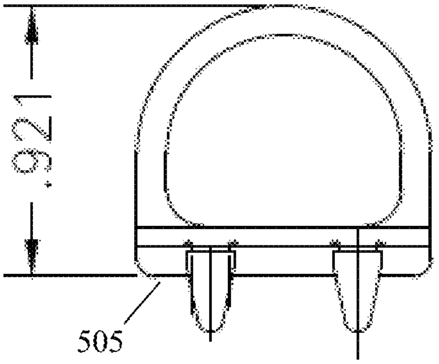
FIG. 32
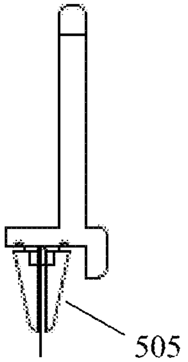
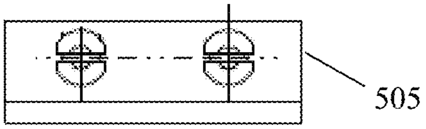
FIG. 33
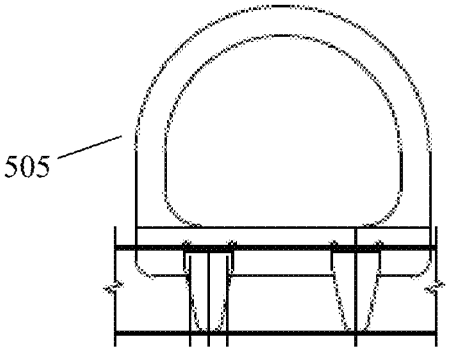
FIG. 34
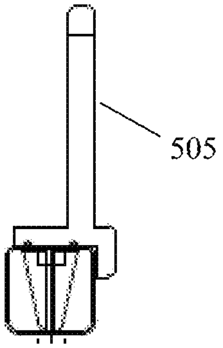
FIG. 35

REDUCED VISIBILITY WINDOW/DOOR SCREEN INCLUDING A REDUCED FRAME PROFILE AND METHOD OF MAKING SAME

CROSS REFERENCES TO RELATED APPLICATIONS

This application is a continuation of U.S. application Ser. No. 15/850,159, filed on Dec. 21, 2017, now issued as U.S. Pat. No. 11,125,012, which claims priority on U.S. Provisional Patent Application Ser. No. 62/440,463 filed on Dec. 30, 2016, on U.S. Provisional Patent Application Ser. No. 62/473,749 filed on Mar. 20, 2017, and on U.S. Provisional Patent Application Ser. No. 62/473,764 filed on Mar. 20, 2017, all disclosures of which are incorporated herein by reference.

FIELD OF THE INVENTION

The present invention relates to improvements in a removable screen that may be used for windows and doors, and more particularly to an improved screen having a minimized screen edge sightline, and unique geometry that provides a per unit cost savings.

BACKGROUND OF THE INVENTION

Although there may have been analogous apparatus used in ancient civilizations, early modern reference to use of wire mesh for a door/window "screen" is found in the 1923 periodical the "American Fanner," as "Wove Wire for Window Screens," An advertisement for window screens was placed in Boyd's Blue Book in 1836, and two window screens were displayed at an Exhibition in Boston in 1839. One of the earliest screen-related U.S. Pat. No. 79,541, was issued to Bayley and McClusky in 1868 for "Improvements in Railroad Car Ventilators," which included a "wire netting screen . . . as applied to the windows to prevent sparks, cinders, dust, etc., from entering the car or boat through the window when open." Numerous other patents have since been issued for various developments relating to the implementation of a screen with respect to a door or window, particularly for a home.

Typical screen construction utilizes a rectangular frame with a groove cut into one side of its entire periphery. A mesh material is cut somewhat larger than the extent of the peripheral groove, and is then overlaid onto that side of the screen. A flexible vinyl "spline" is next overlaid on the screen above the groove, and is pressed into the grove, forcing the mesh therein. The diameter of the spline, typically 3.6 mm to 4.8 mm, is sized to be retained within the groove, in combination with the thickness of mesh used, in a friction fit. Any protruding excess mesh material may then be trimmed away. The present invention offers improvements over such construction, and that which is shown by other prior art patents.

OBJECTS OF THE INVENTION

It is an object of the invention to enhance the aesthetic appearance of a window or door.

It is another object of the invention to provide a screen with a significantly narrowed frame that may only appear as a slight shadow on a window upon which it is installed.

It is an object of the invention to provide a screen that eliminates or minimizes the need for exact color matching of the screen frame to the vinyl or other material used for the master frame of the window/door.

It is another object of the invention to provide a screen frame design that provides an overall reduction of screen inventory SKUs needed for matching of the screen to the windows/doors.

It is a further object of the invention to provide a screen having a reduction of screen frame substrate mass per screen, with a corresponding reduction in raw material costs.

It is also an object of the invention to provide a durable window screen frame that is perceived to be, and has the feel of, a rigid conventional frame, but which decreases the screen sight line of the typical frame by 60 percent, and decreases the sight line of traditional wide frame screens by 90 percent.

It is a further object of the invention to provide a screen that eliminates the use of a spline to prevent cloth pull out during job site handling or customer handling, and to reduce labor costs.

It is another object of the invention to provide a method of producing a screen that reduces the manufacturing floor space required.

It is an object of the invention to use of a high strength adhesive and process for securing the mesh to the screen frame that provides a pull out strength tested to be at least 150 percent of the standard requirements promulgated by the Screen Manufacturers Association, in its Specification for Insect Screens for Windows, Sliding Doors and Swinging Doors.

It is a further object of the invention to provide an assembly process that eliminates heat damage to the surface of the cloth mesh or the screen frame.

It is another object of the invention to provide a frame that is laser welded or sonically welded at only one location, and eliminates the use of corner keys, and eliminates the requirement for color-matched corners.

It is a further object of the invention to provide a screen frame and associated hardware that prevents racking, and remains square.

It is also an object of the invention to provide unique installation hardware with the screen frame that may automatically center the screen in the window/door frame, to provide a more uniform appearance.

It is another object of the invention to provide a low-profile screen frame that may be utilized in combination with any premium screen cloth material.

It is a further object of the invention to provide a screen frame manufacturing process that may reduce or eliminate one or more of the traditional steps of screen construction, including: cutting, punching, staking, rolling of the spline, trimming, assembly steps, and wasted material.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a reduced visibility screen, for use in a master frame of a window or a door, may broadly include a particularly formed narrow profile frame, and a mesh that is also particularly formed and applied to the narrow profile frame. The narrow profile frame may be a frame formed from a single elongated cross-sectional member having a first end and a second end, and may be bent at least at three corners (i.e., to form a triangular shape), or at four corners to form four sides, and to position the first end adjacent to the second end. The first end may be fixedly secured to the second end by being welded thereto using a sonic welding process or other welding/joining process.

An adhesive may be applied to a side surface of the narrow profile frame, and a mesh may then be applied over the adhesive. The mesh may be configured to extend to a distal end of the side surface of each of the four sides of the narrow profile frame.

Another embodiment of a reduced visibility screen may also broadly include a leaf spring that may be used in combination with the narrow profile frame, and may be configured to bias and center the screen within the master frame. In one embodiment, at least a portion of the leaf spring may have a curved shape, which curve may be an arc, a portion of an ellipse, a portion of a parabola, or any other suitable curve. The narrow profile frame, which may be hollow, may have one of its outwardly disposed surfaces of one side of its four sides be formed with a first hole and a second hole, being spaced a particular distance apart. The leaf spring may have a first end formed into a hook shape, and a second end also formed into an opposingly shaped hook. In another embodiment the leaf spring may have a first straight portion between the first end and a curved centrally positioned portion, and a second straight portion between the second end and the centrally positioned curved portion, which may better facilitate biasing and centering of the screen within a correspondingly shaped recess in the master window frame, as discussed hereinafter, The leaf spring may also be formed with a selective length, such that the hook at the first end of the leaf spring and the hook at the second end of the leaf spring may be respectively received within the spaced apart first and second holes in the side of the narrow profile frame, when the leaf spring is deformed to be substantially straight, and the hooks may also be respectively engaged upon opposite sides of the first and second holes when the deformed leaf spring is allowed to return to its undeformed shape.

Another embodiment of a reduced visibility screen may also broadly include a third hole formed in the narrow profile frame, being formed substantially mid-way between the first and second holes; a plunger pin; and a handle. The plunger pin may be slidably disposed in the third hole, and may have a first end fixedly secured to the leaf spring, being substantially centered between the first and second ends of the leaf spring. The handle member may have a cam surface, and may be movably secured to the second end of the plunger pin, and may be member movable between first and second positions using the cam surface positioned against a side portion of the screen frame, to actuate the plunger pin to respectively actuate the leaf spring between being deformed and undeformed. The cam surface may be configured such that it may be actuated to deform the leaf spring and retain the leaf spring in the deformed condition, after removal of the actuating force that placed the leaf spring into the deformed condition.

Another embodiment of a reduced visibility screen may also broadly include one or more clips secured to any of the four sides of the frame, which clip(s) may be used for handling of the screen during installation into the master frame and removal therefrom. In one embodiment, the clip may be secured to a side of the frame being on an opposite side from which the holes and leaf spring are secured. The clip may include a small return flange configured for easy handling of the screen.

BRIEF DESCRIPTION OF THE DRAWINGS

The description of the various example embodiments is explained in conjunction with appended drawings, in which:

FIG. 8 illustrates a side view of a reduced visibility screen formed in accordance with a second embodiment of the present invention;

FIG. 9 is a bottom view of the reduced visibility screen shown in FIG. 8;

FIG. 9A is an enlarged bottom view showing an alternate embodiment of leaf spring being used on the frame of the reduced visibility screen shown in FIG. 8;

FIG. 10 is a cross-sectional view through an upper portion of the reduced visibility screen shown in FIG. 8;

FIG. 11 shows an enlarged portion of the bottom view of FIG. 9, with the leaf spring shown prior to installation into the holes in the side of the frame, and with the leaf spring shown rotated ninety degrees to expose its hooked ends;

FIG. 12A is an enlarged view of one end of the leaf spring shown in FIG. 11;

FIG. 12B is a front view of the leaf spring shown in FIG. 12A;

FIG. 13A shows an enlarged portion of the screen embodiment shown in the side view of FIG. 8, with the leaf spring shown in an undeformed, generally curved condition;

FIG. 13B is the side view of FIG. 13A, but is shown with the leaf spring deformed to be substantially straight to be extended to substantially its maximum length;

FIG. 25 is an exploded view showing the component parts for a helical spring biased plunger pin arrangement, including a frame, a plunger, a cap, and the spring;

FIG. 26 is an enlarged side view of the plunger shown in FIG. 25;

FIG. 27 is an end view of the plunger of FIG. 26;

FIG. 28 is a cross-sectional view through the plunger of FIG. 26;

FIG. 29 shows the component parts of FIG. 25 assembled to form the plunger pin arrangement, being shown with the plunger pin in the extended position;

FIG. 30 is the plunger pin arrangement of FIG. 29, but is shown with the plunger pin in the extended position;

FIG. 31 is a side view of a pull tab usable with the reduced visibility screen shown in FIG. 1 and FIG. 3;

FIG. 32 is an end view of the pull tab of FIG. 31;

FIG. 33 is a bottom view of the pull tab of FIG. 31;

FIG. 34 is a side view showing the pull tab of FIG. 31 installed within the frame of a reduced visibility screen in accordance with the present invention; and FIG. 35 is a cross-sectional view through the pull tab and frame, as shown in FIG. 34.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference.

Furthermore, the described features, advantages, and characteristics of any particular embodiment disclosed herein, may be combined in any suitable manner with any of the other embodiments disclosed herein.

It is further noted that any use herein of relative terms such as "top," "bottom," "upper," "lower," "vertical," and "horizontal" are merely intended to be descriptive for the reader, based on the depiction of those features within the figures for one particular position of the screen, and such terms are not intended to limit the orientation with which the screen of the present invention may be utilized.

Figure 1:
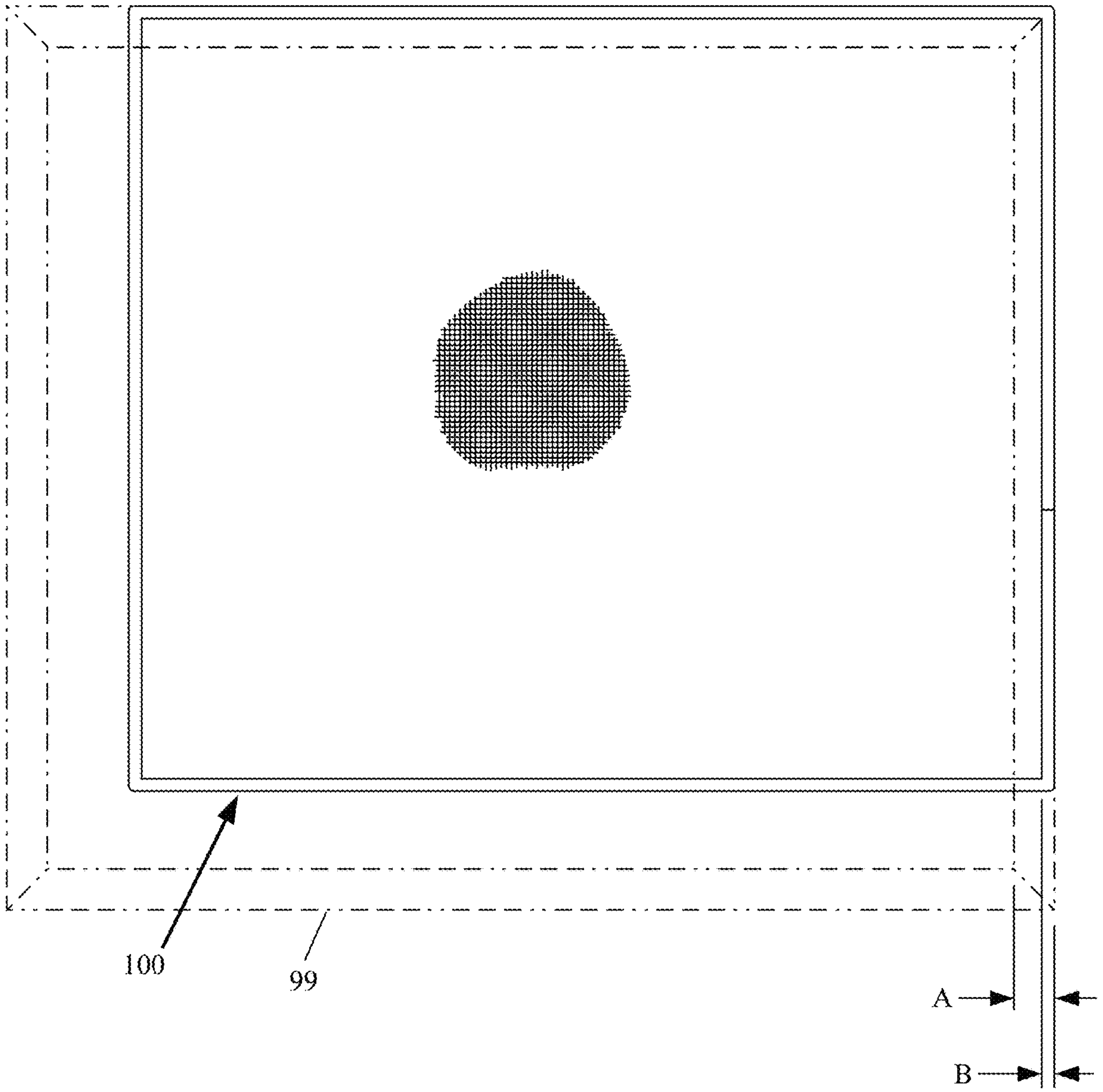
FIG. 1 is a side view showing a reduced visibility screen formed in accordance with a first embodiment of the present invention overlaid upon a prior art screen.
Figure 3:
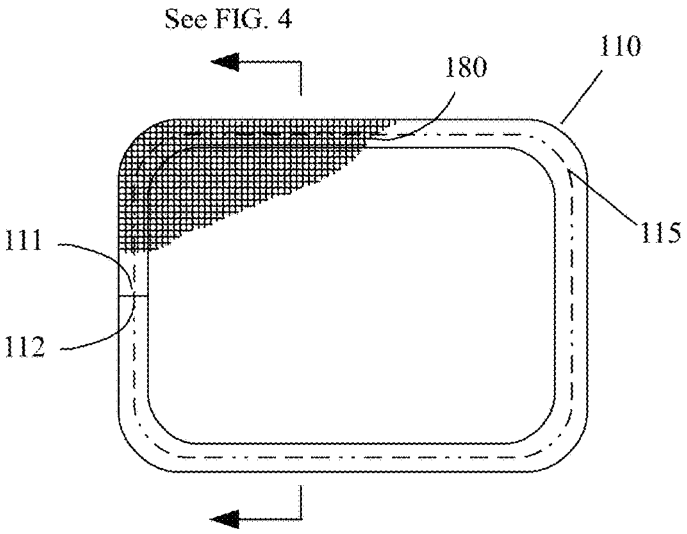
FIG. 3 illustrates a side view of the reduced visibility screen shown in FIG. 1, shown with generously radiused outside corners.
Figure 4:
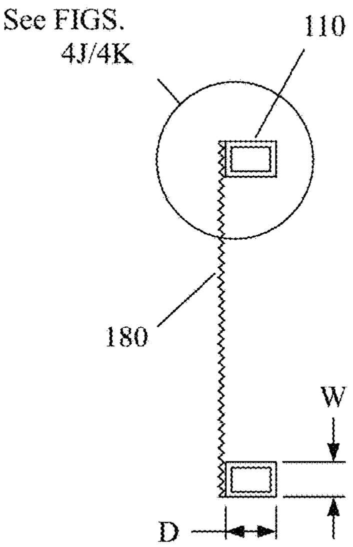
FIG. 4 is a cross-sectional view taken through the reduced visibility screen shown in FIG. 1.

FIG. 1 illustrates a side view showing a reduced visibility screen 100 formed in accordance with a first embodiment of the present invention, being overlaid upon a prior art screen 99. As seen therein, the configuration for the screen 100 and the manufacturing processes utilized permits the reduced visibility screen to have a width dimension B that may be 60 percent less than the width A of a conventional frame, and which may be 90 percent less than the width of a traditional wide frame screen. A corner of the screen 100 is illustrated in the perspective view of FIG. 2. A view showing the corners/bends of the frame 110 of screen 100 is shown in FIG. 3, having a mesh 180 applied thereto. A cross-sectional view of the screen 100 is shown in FIG. 4. Note that the outer corners illustrated within FIG. 3 may in one embodiment be so small as to at least approach being a squared-off corner.

FIGS. 5A through 5I illustrate a first embodiment of a process that may be used for forming the screen 100.

Figure 5A:
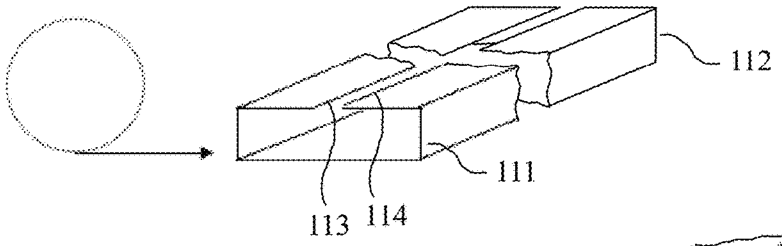
FIG. 5A illustrates a first step in the process of forming the frame of the reduced visibility screen shown in FIG. 1.
Figure 5B:
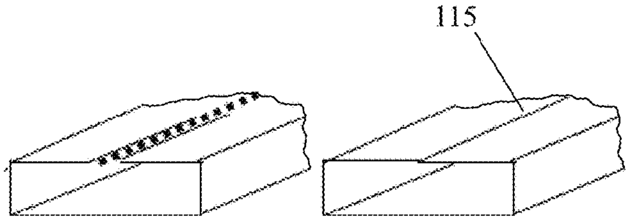
FIG. 5B illustrates a second step in the process of forming the frame of the reduced visibility screen shown in FIG. 1.

In a first step of the process shown in FIG. 5A, the raw material for the frame may be formed into an elongated member, having a first end 111 and a second end 112. The elongated member may be formed by rolling a first side 113 of an elongated flat raw stock material toward a second side 114, to have four interior corners forming an enclosed shape that may preferably have a rectangular cross-section, with said first side adjacent to said second side forming a seam 115 along a length of said elongated member, between the first end 111 and the second end 112, as shown in FIG. 5B and FIG. 3. In other embodiments, the raw material may be rolled to form an elongated member that may have a cross-sectional shape in the form of a triangle, or a parallelogram, or a trapezoid, or a square, or polygonal shape, or any other suitable cross-sectional shape, each of which may have at least one flat surface to which the mesh may be bonded.

In the second step shown in FIG. 5B, the adjacent sides 113 and 114 of the elongated member may be may joined, as shown on the left side therein, using any suitable manufacturing process to produce the elongated cross-sectional shape shown on the right side therein. The joining process may include, but is not limited to, being spot welded by a sonic welder, overlap knurling, dimple crimping, etc. Some other exemplary cross-sectional shapes that may be formed from the raw material are shown in FIGS. 4J and 4K.

The raw material for the screen frame may be roll formed steel, roll formed aluminum, or could alternatively be extruded aluminum, including alloys (e.g., various forms of stainless steel), all forms of plastics, such as including, but not limited to, PVC, fiberglass, composites, and even wood, or possibly a suitable combination of such materials, or such material that will at least maintain stability sufficient to function for the screen frame.

Figure 5C:
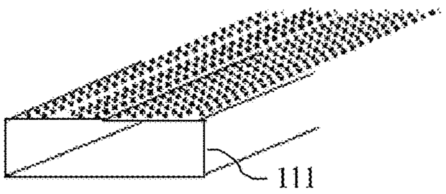
FIG. 5C illustrates a third step in the process of forming the frame of the reduced visibility screen shown in FIG. 1.

The raw material used for the frame may be appropriately colored, or alternatively the elongated cross-sectional shape may be colored or shaded as required during the process step shown in FIG. 5C. The color of the adhesive and the color of the frame may be selected to generally match the color of the master window frame. It is intended that the reduced sightline of the frame formed herein, when used in conjunction with the corresponding socket formed in the window/door, reduces the exposed portion of the frame that protrudes from the socket of the master frame, as discussed hereinafter, thereby minimizing the extent to which exact color matching is required, as the exposed frame may appear to fall within the shadow of the master frame of the window/door. This may serve to reduce the inventory of screen SKUs needed for sufficiently close matching of the screen frame to the master frame of the windows/doors. Therefore, the coloring agents and pigmentations used are not limiting factors. Any and all shading and coloring are intended to be utilized in tandem with the frame of the reduced visibility screen 100 described herein, so as so achieve a pleasing and virtually indistinguishable sight line for the screen frame, and to focus the viewers eye to a smooth transition of screen mesh material to the master frame of the window/door.

Figure 5D:
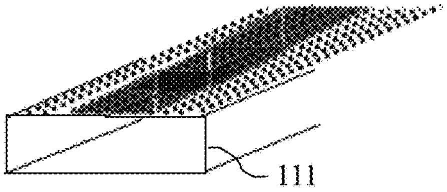
FIG. 5D illustrates a fourth step in the process of forming the frame of the reduced visibility screen shown in FIG. 1.

The screen raw material must also be capable of receiving an appropriate adhesive and screen mesh material. One approach for application of the adhesive is shown in FIG. 5D, which step may alternatively be performed before, during, or after the bending step. The adhesive may be applied using a roll coater. An in-line adhesive application process may be used in lieu of the roll coating processes.

Figure 5E:
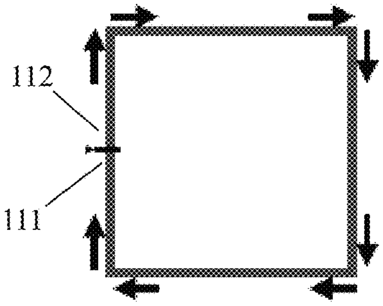
FIG. 5E illustrates a fifth step in the process of forming the frame of the reduced visibility screen shown in FIG. 1.
Figure 7:
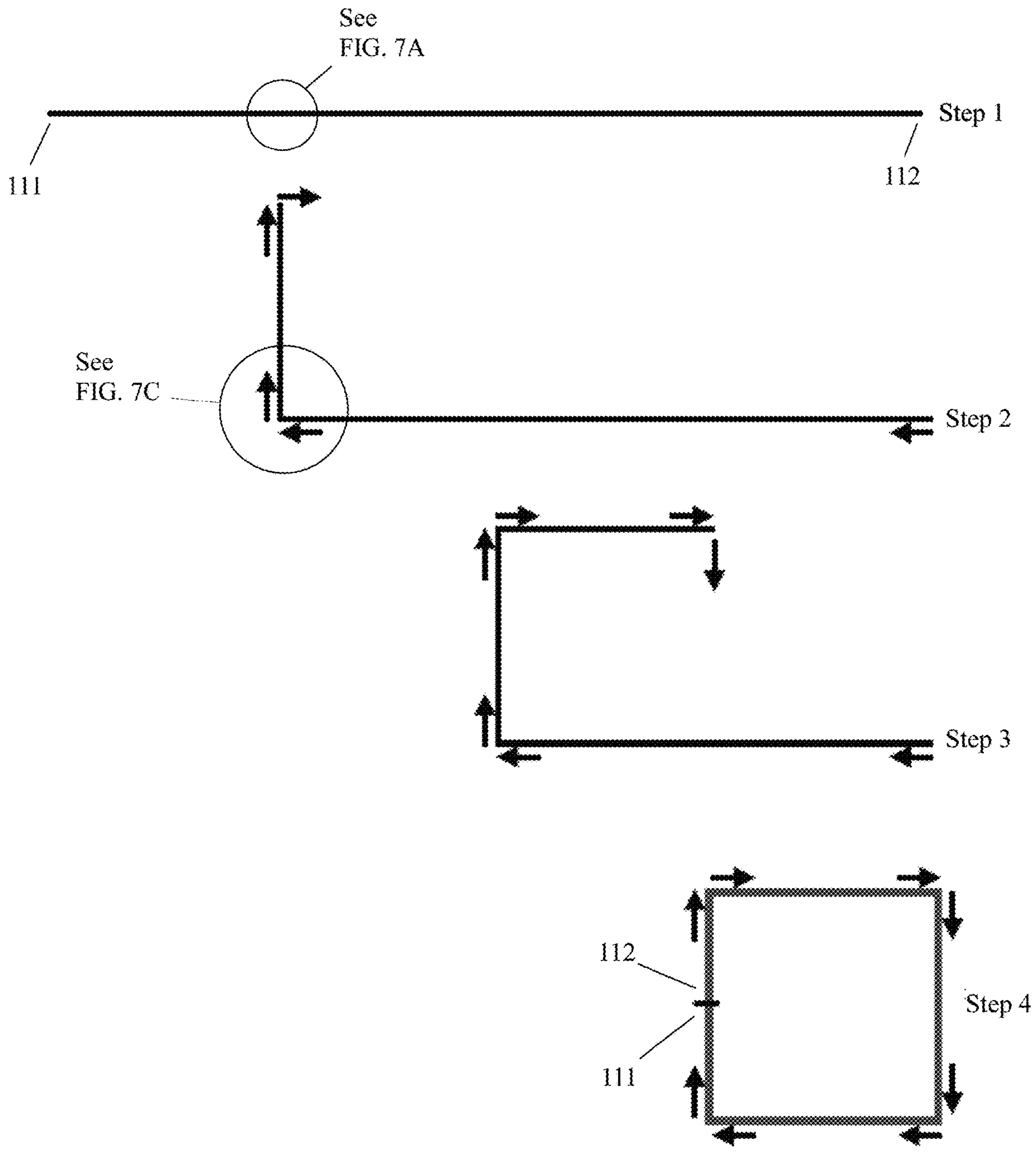
FIG. 7 illustrates the process of bending an elongated member to form the four-sided frame shown in FIG. 5E.
Figure 7B:
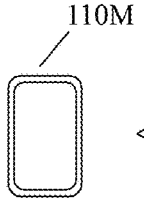
FIG. 7B shown a cross-sectional view of the frame of FIG. 7A.
Figure 7A:
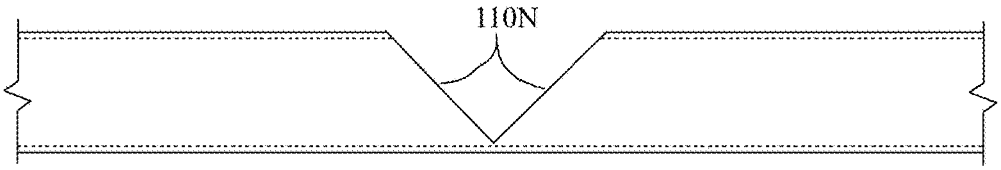
FIG. 7A shows an enlarged detail view of an alternate embodiment of the frame, being formed with a V-shaped notch prior to being bent.
Figure 7C:
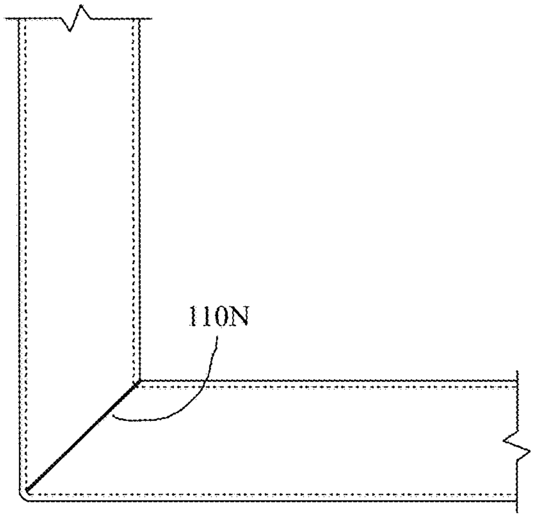
FIG. 7C shows the notched frame of FIG. 7A, after being bent.
Figure 7D:
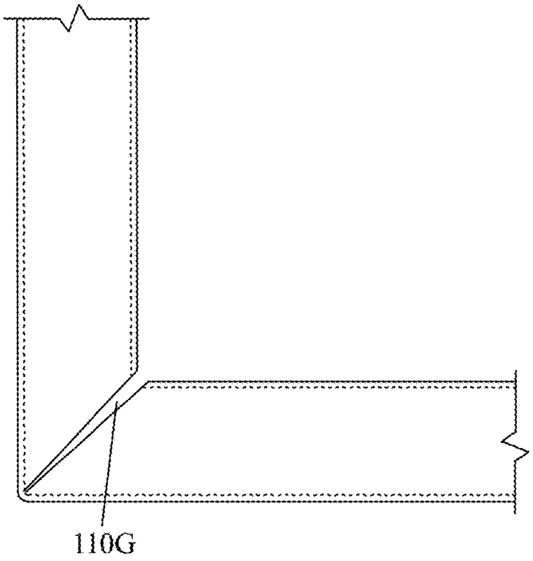
FIG. 7D shows the notched frame of FIG. 7A, after being bent, but where the notch was formed to leave a gap between the bent-up adjacent frame sections.
Figure 7E:
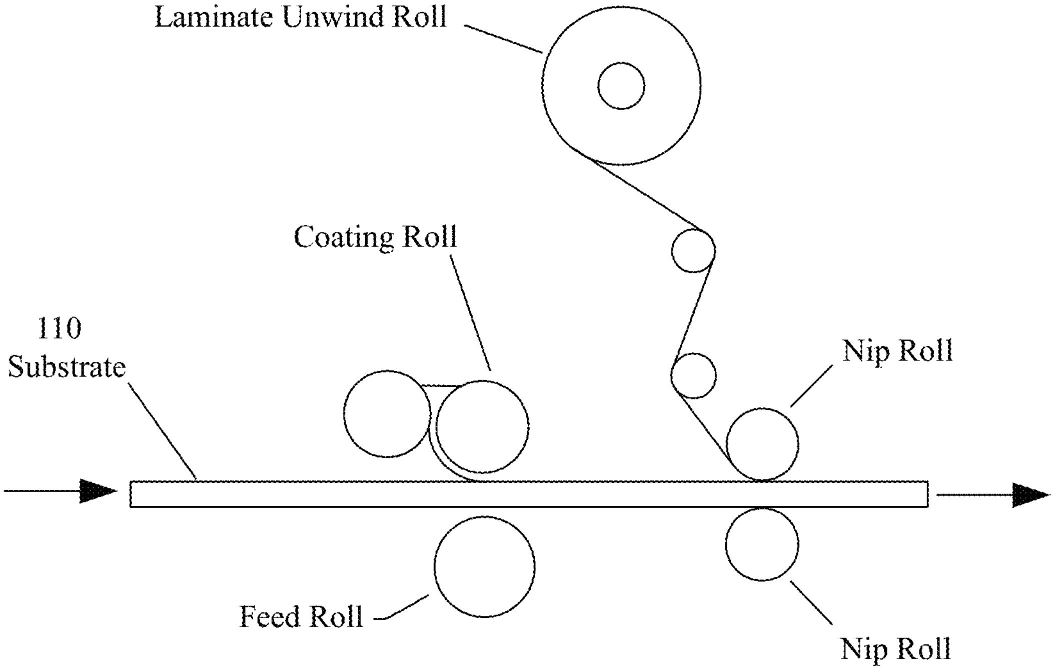
FIG. 7E illustrates a roller arrangement for unwinding a roll of adhesive or a laminate onto the screen frame substrate.

The bending step is shown in the overall process within FIG. 5E, and is shown in more detail in the four steps illustrated in FIG. 7. As seen therein, the four steps begin with the elongated cross-sectional shape having the appropriate length for the finished screen dimensions, a length that takes into account the bend radius or radii. The elongated cross-sectional shape undergoes a "cartwheel" forming process. During the cartwheel forming process, a first bend is formed at step 2 shown in FIG. 7, then the elongated cross-sectional member may be fed to the bending apparatus for another bend to be formed, and so on for the member to be bent at as many corners as needed to form the desired shape (e.g., four corners to form a four sided rectangular-shaped frame), and to position the first end 111 adjacent to the second end 112. (Note a three-sided triangular-shaped frame, or an octagonal-shaped frame, or any other shaped frames may alternatively be formed as desired). Also, the bending process may alternatively be incorporated into the roll forming sequence so as to achieve a throughput efficiency with minimal handling. In one embodiment, the elongated cross-sectional shape may be bent at each location with sufficiently large bend radii to accommodate the bending process without causing cracks to form in the bent-up cross-sectional shape. In another embodiment, shown in FIG. 7A, a notch 110N may first be formed in the elongated cross-sectional shape 110M at each bend location to form multiple sections, but leaving at least a portion of one of the walls of the elongated cross-sectional shape intact. Once bent, the end of one of the sections that were cut to form the notch may be adjacent to or actually contacting another such section, as seen at 110N' in FIG. 7C, and those ends may then be fixedly joined together. In another embodiment, shown in FIG. 7D, a larger notch may be formed so as to leave a gap 110G between the ends of each of the sections, which gap may be angled. The gap may be used to facilitate welding of the sections together.

Figure 5F:
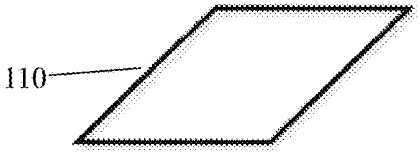
FIG. 5F illustrates a sixth step in the process of forming the frame of the reduced visibility screen shown in FIG. 1.

The first end 111 may similarly be fixedly joined/secured to the second end 112 using any suitable joining process to thereby form the continuous frame structure with only a single lateral joint (and possibly the seam along the length of the elongated member), as shown in FIG. 5F, which joining process may include, but is not limited to being: welded, fused, glued, mechanically fastened, etc. The joint may be located at any position on the perimeter of the frame. The joint may be strengthened by being filled, in addition to the joining process used. Also, the corner locations may similarly be filled to strengthen the corners from racking, twisting, or loosening. Also, notching and material removal may be incorporated at the corner locations. Note that rather than the above notching and bending approach for forming the frame, the corner key type of construction may instead be utilized, as disclosed at least by U.S. Pat. No. 514,654 to Higgin; U.S. Pat. No. 1,038,367 to Henry; U.S. Pat. No. 1,187,402 to Traut; U.S. Pat. No. 2,989,788 to Kessler; U.S. Pat. No. 3,321,885 to Pratt; U.S. Pat. No. 4,502,260 to Machler; U.S. Pat. No. 4,570,406 to DiFazio; U.S. Pat. No. 5,547,011 to Dotson; and U.S. Pat. No. 9,631,417 to Massey.

Use of the term adhesive herein is intended to broadly indicate all possible types of bonding agents or bonding means or material, including, but not limited to: super glue (also known as cyanoacrylate adhesives); pressure sensitive adhesives (PSA); spray adhesives; liquid white glues such as polyvinyl acetate (PVA); epoxy; polyurethane; white craft glue; yellow wood glue/vinyl acetate polymers; organic solvent adhesives; wet bonding adhesives; contact adhesives; polymer dispersions/emulsions; plastisols; water based adhesives/glues; phenol-formaldehyde resins; two-component adhesives such as two-part epoxies, methyl methacrylate, silicone adhesive, urethanes; one part epoxies such as silicones, anaerobic cyanoacrylates, heat cured types, moisture cured types, radiation cured types; sealants, a reactive hot melt adhesive, pressure sensitive adhesive tape, double sided adhesive tape, single sided adhesive tape, reinforced tape, unsupported tape, etc. The adhesive may require a secondary, in-line or off-line, curing step, such as the application of infrared light or ultra violet light. In one embodiment, the adhesive used may be the adhesive sold under the trade name of Rapidex®1011, which is manufactured by HB Fuller. In another embodiment, the adhesive may be a marine adhesive, and may thus be capable of strong bonds even when exposed to rain or when fully submersed in water. In an embodiment where a marine adhesive is used, the adhesive may be, for example, the adhesive sold under the trade name of Marine Adhesive Sealant 5200 Fast Cure, which is manufactured by 3M™ Corp.

Figure 4A:
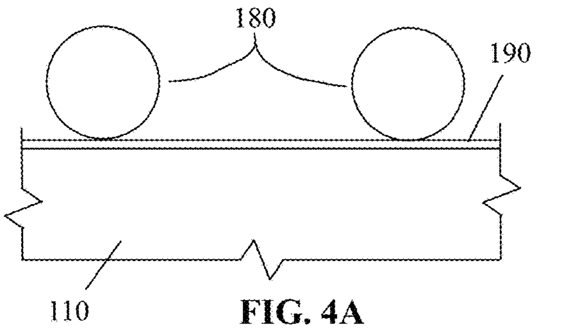
FIG. 4A is an enlarged cross-sectional view showing portions of the mesh being joined to the frame of the screen using a thin layer of adhesive applied to the frame.
Figure 4B:
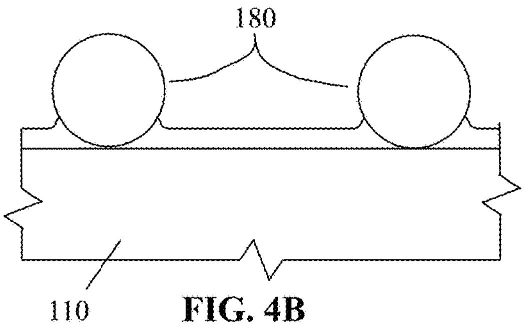
FIG. 4B is the enlarged cross-sectional view of FIG. 4A, but is shown with the portions of the mesh having been pressed into the adhesive to be in contact with the frame of the screen.
Figure 4C:
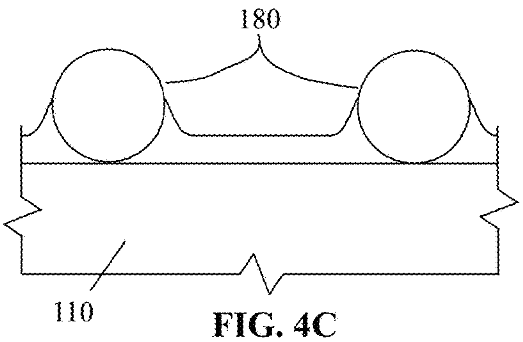
FIG. 4C is the enlarged cross-sectional view of FIG. 4B, but is shown with a thicker layer of adhesive applied to the frame.
Figure 4D:
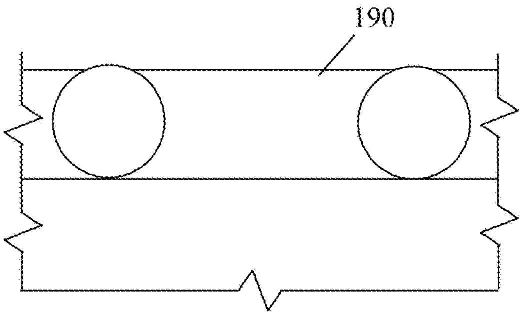
FIG. 4D is the enlarged cross-sectional view of FIG. 4C, but is shown with an even thicker layer of adhesive that encompasses the majority of the exterior surface of the mesh, but does not cover the portion of the mesh that is most distal from the frame of the screen.

The amount of adhesive used and the method of application of the adhesive may be different in various embodiments. In one embodiment, the thickness of the adhesive used may vary based on the thickness of the mesh material, and some exemplary mesh materials and thicknesses are as follows:

9×9 0.0 VENT MESH—0.016-0.017 mil
18×14 0.011—0.012-0.013 mil
18×14 0.013—0.015-0.016 mil
18×16 0.011 Std.—0.012-0.013 mil
18×18 0.007 UV 0.008-0.009 mil
18×18 0.008 BV 0.010-0.011 mil
20×20 0.013—0.015-0.016 mil
20×30 0.013—0.018-0.019 mil
17×13 0.013 TSCREEN—0.022-0.023 mil
18×18 0.013 TSCREEN—0.019-0.020 mil
18×22 0.013 TSCREEN—0.019-0.020 mil
17×10 0.025 PET SCR.—0.032-0.033 mil
17×14 0.025 SUNTEX 80—0.031-0.032 mil
23×16 0.025 SUNTEX 90—0.034-0.035 mil
57×16 SUNSCREEN—0.020-0.021 mil
57×19 SUNSCREEN—0.019-0.020 mil In one embodiment, a thin layer of adhesive 190 may be used, and the layer may be applied to the frame 110, as shown in FIG. 4A. The layer of adhesive may separate the mesh 180 material from the frame. Alternatively, as shown in FIG. 4B, the mesh may be pressed sufficiently into the adhesive to be in contact with the frame. Depending upon the properties of the adhesive (e.g., the extent to which it may flow), as the mesh is pressed into the thin adhesive layer, such contact from the mesh may cause an amount of the adhesive layer to wrap around a portion of the cross-section of the screen, which may be between 5 percent and 25 percent of the distance that the screen protrudes away from the flat surface of the frame. As seen in FIG. 4C, where a is thicker layer of adhesive has been applied to the frame, as the mesh is pressed into the thicker layer, it may result in the adhesive locally wrapping around a portion of the side of the mesh, and may reach between 25 percent to 75 percent of the distance that the screen protrudes away from the flat surface of the frame. A substantially thicker layer of adhesive may be used such that it may encompass the majority of the exterior surface of the mesh at the frame, but does not cover the portion of the mesh that is most distal from the frame of the screen, as shown in FIG. 4D. In this embodiment, the adhesive may reach between 75 percent and 99 percent of the distance that the screen protrudes away from the flat surface of the frame. (Note, although a circular cross-section is shown for the mesh, which may be formed from drawn wire, other cross-sectional shapes may also be used, such as a square shape, or another polygonal shape, etc.).

Figure 4E:
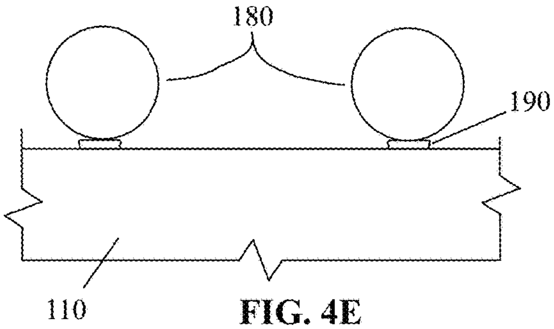
FIG. 4E is an enlarged cross-sectional view showing portions of the mesh being joined to the frame of the screen using a thin layer of adhesive applied to the mesh.
Figure 4F:
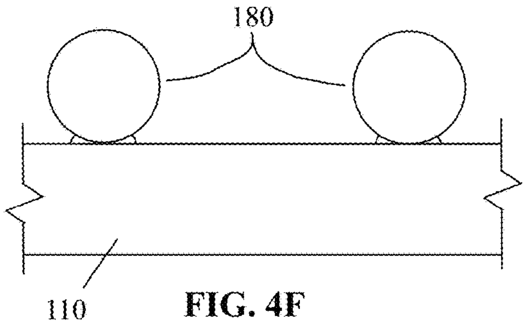
FIG. 4F is the enlarged cross-sectional view of FIG. 4E, but is shown with the portions of the mesh having been pressed into the adhesive to be in contact with the frame of the screen.
Figure 4G:
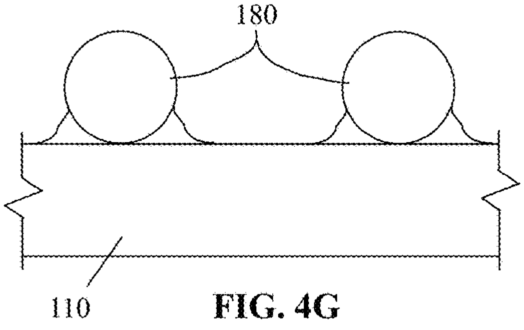
FIG. 4G is the enlarged cross-sectional view of FIG. 4F, but is shown with a thicker layer of adhesive having been applied to the mesh.
Figure 4H:
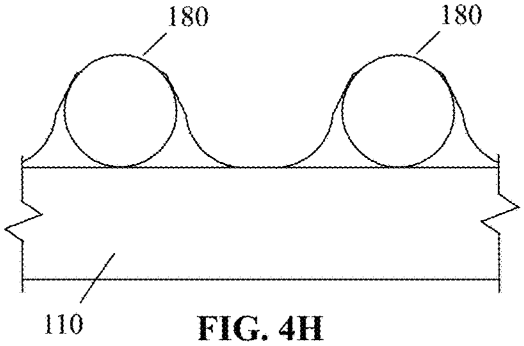
FIG. 4H is the enlarged cross-sectional view of FIG. 4G, but is shown with an even thicker layer of adhesive having been applied to the mesh that encompasses the majority of the exterior surface of the mesh, but does not cover the portion of the mesh that is most distal from the frame of the screen.

In another embodiment, a thin layer of adhesive may be used, and the layer may be applied to the mesh, as shown in FIG. 4E, and which mesh may also be pressed to be in contact with the frame, as shown in FIG. 4F. As seen in FIG. 4G, where a thicker layer of adhesive has been applied to the mesh, as the mesh is pressed into contact with the frame, the adhesive may tend to wrap around a portion of the side of the mesh. With an even thicker layer of adhesive having been applied to the mesh, it may tend to encompass the majority of the exterior surface of the mesh, when pressed into contact with the frame, as seen in FIG. 4H; however, the amount of adhesive used should be limited to prevent it from covering the portion of the mesh that is most distal from the frame of the screen. It is noted that the mesh material 180 may preferably be bonded to an entire side of the frame 110 (see FIG. 4), which side is a flat surface across the width W of the frame, with the flat surface being without any recesses, channels or indentations along its circuitous length, and which side is generally parallel to its opposite surface of the cross-sectional shape. In one embodiment, this securing of the mesh 180 to the frame 110 is accomplished solely through the use of the adhesive, and no other means of securing the mesh to the frame is used other than the adhesive. In another embodiment, this securing of the mesh 180 to the frame is accomplished substantially solely through the use of the adhesive, as one or more pieces of tape and/or one or more staples on each side may be used to temporarily support and stretch the mesh across the frame until the adhesive has set.

Figure 4I:
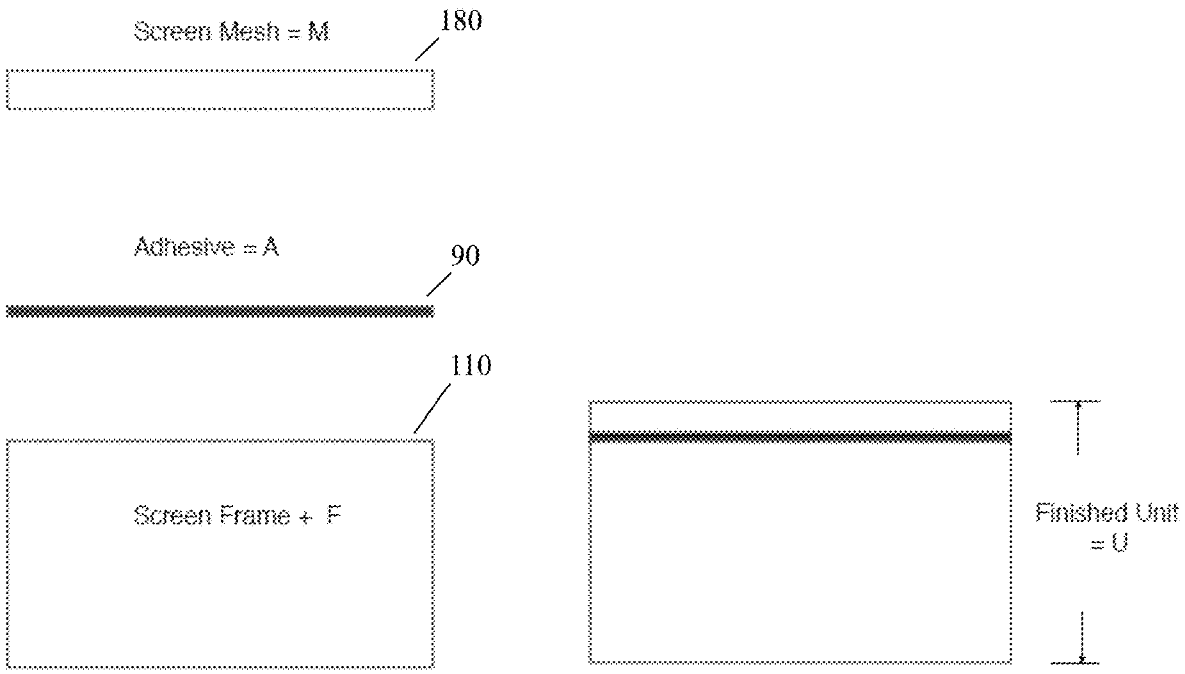
FIG. 4I schematically illustrates the thickness buildup of the frame, mesh and adhesive used to form the screen.
Figure 4J:
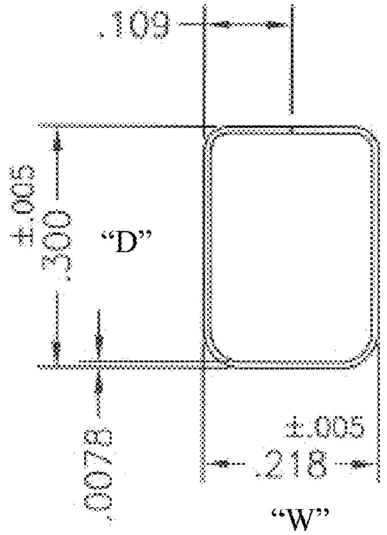
FIG. 4J is an enlarged detail view of a first embodiment of a cross-sectional shape that may be used for the reduced visibility screen shown in FIG. 1 and FIGS. 3-4.
Figure 4K:
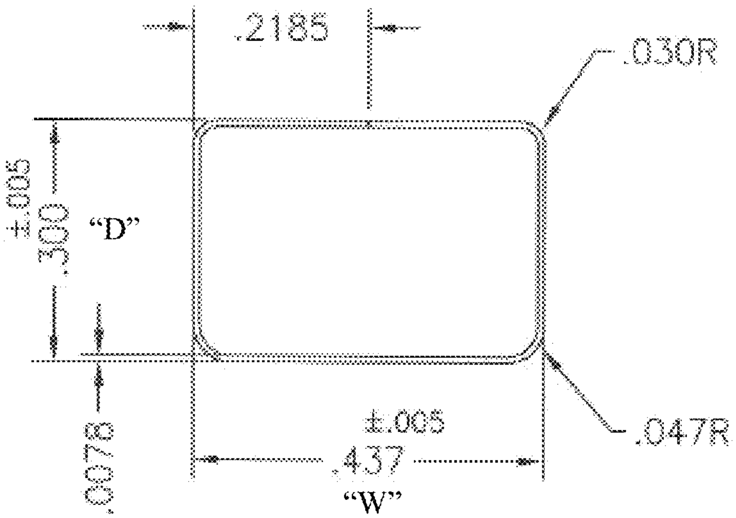
FIG. 4K is an enlarged detail view of a second embodiment of a cross-sectional shape that may be used for the reduced visibility screen shown in FIG. 1 and FIGS. 3-4.

FIG. 4I schematically illustrates the thickness buildup of the frame, mesh and adhesive used to foam the screen. Where the mesh is not pressed into the adhesive (e.g., FIGS. 4A and 4E), the thickness of the finished screen unit may be the sum of the thicknesses of the frame, the adhesive, and the mesh (i.e., U=M+A+F). Where the mesh is pressed into the adhesive, the thickness of the finished screen unit would be less than the sum of the thicknesses of the frame, the adhesive, and the mesh (i.e., U<M+A+F). Where the mesh is pressed into the adhesive to be in contact with the frame (e.g., FIGS. 4B and 4C) and there is not any crushing/deformation of the mesh, the thickness of the finished screen unit would be the sum of the thicknesses of the frame and the mesh, because the thickness of the mesh is greater than the thickness of the adhesive (i.e., U=M+F, because M>A).

Figure 5G:
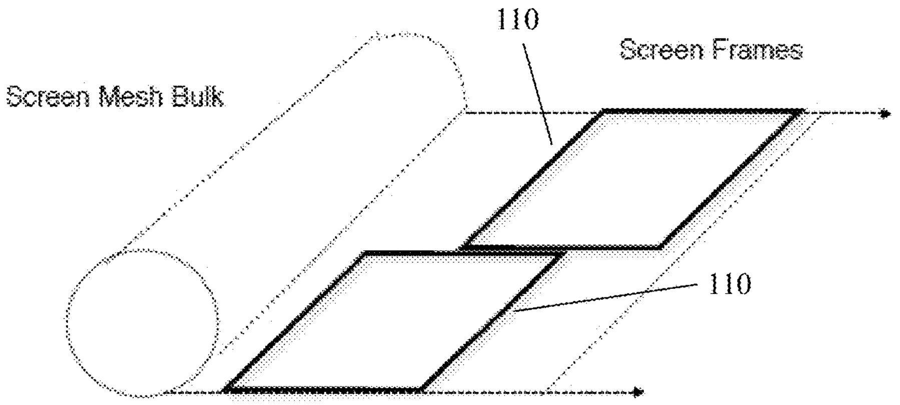
FIG. 5G illustrates a seventh step in the process of forming the frame of the reduced visibility screen shown in FIG. 1.

FIG. 5G illustrates placement of mesh material onto the adhesive covered side of the frame. The mesh material may be precut to size, or alternatively, as shown in FIG. 5G, may be applied from a roll of mesh material, and may be trimmed during the unrolling of the mesh onto the frame. A pinch roller or a pair of pinch rollers may be used to firmly embed the mesh within the adhesive layer.

The thickness of the layer of adhesive applied may therefore be such that it may be present on the side of the mesh that contacts the frame, and the sides that are laterally oriented with respect to the frame, but the adhesive should not be so thick as to extend above the outwardly facing surface of the mesh, so as to not be excessive, as seen in FIGS. 4D and 4H.

Figure 2:
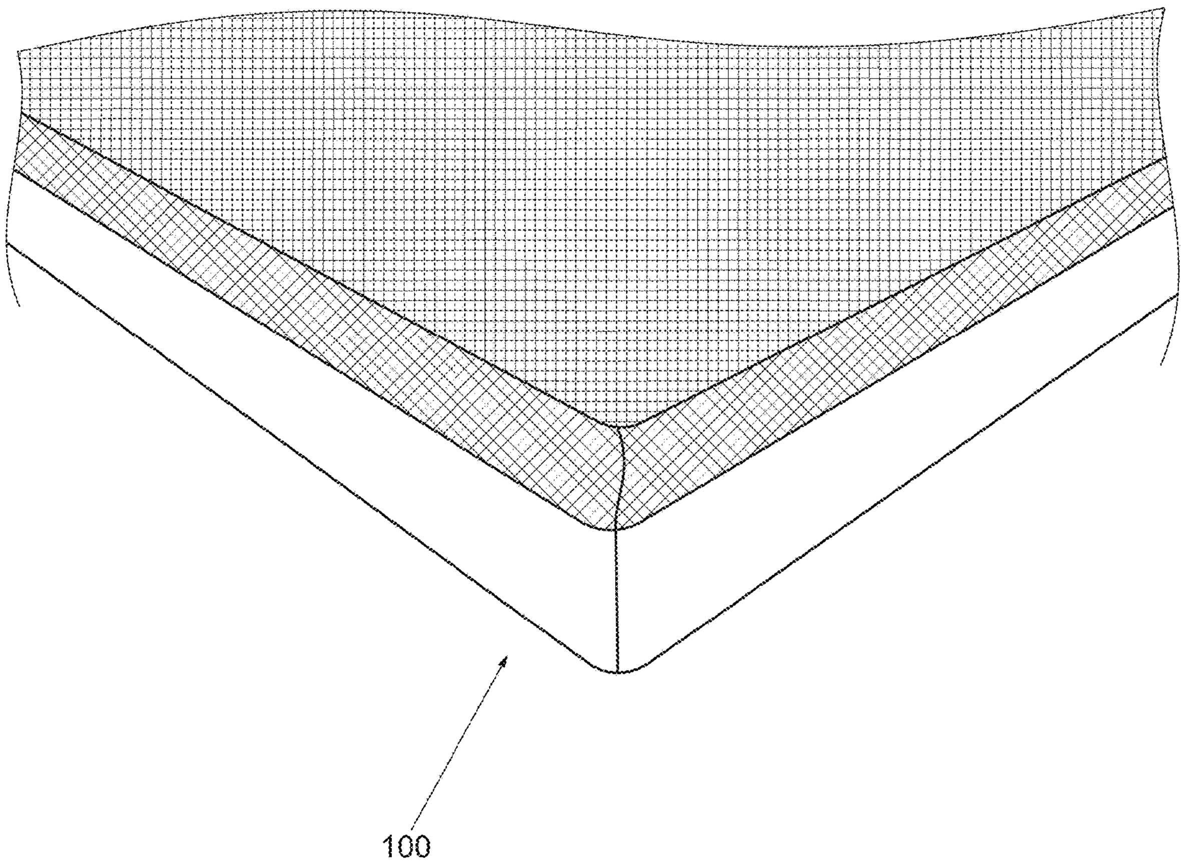
FIG. 2 illustrates a perspective view of one corner of the reduced visibility screen shown in FIG. 1.
Figure 5H:
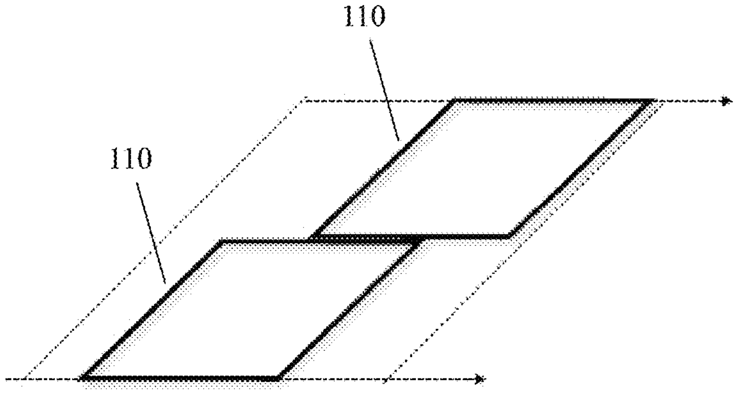
FIG. 5H illustrates a eighth step in the process of forming the frame of the reduced visibility screen shown in FIG. 1.
Figure 5I:
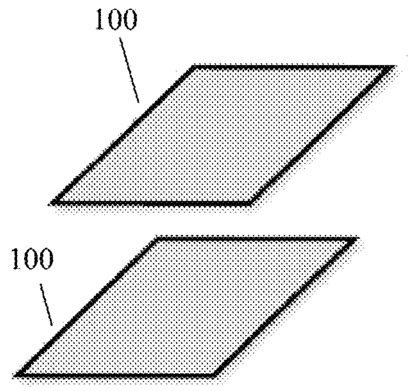
FIG. 5I illustrates a ninth step in the process of forming the frame of the reduced visibility screen shown in FIG. 1.

FIG. 5H illustrates a trimming operation configured so that the mesh terminates at the distal end of the adhesive covered side of the frame, as shown in FIG. 2. The final trimming operation may occur after the adhesive has cured. The adhesive and the mesh may be applied to the frame as either an outer screen mesh placement or an inner screen mesh placement. The adhesive and mesh material may be overlaid upon the seam for increased strength and/or rigidity. The completed frame 100 is shown in FIG. 5I.

Figure 6:
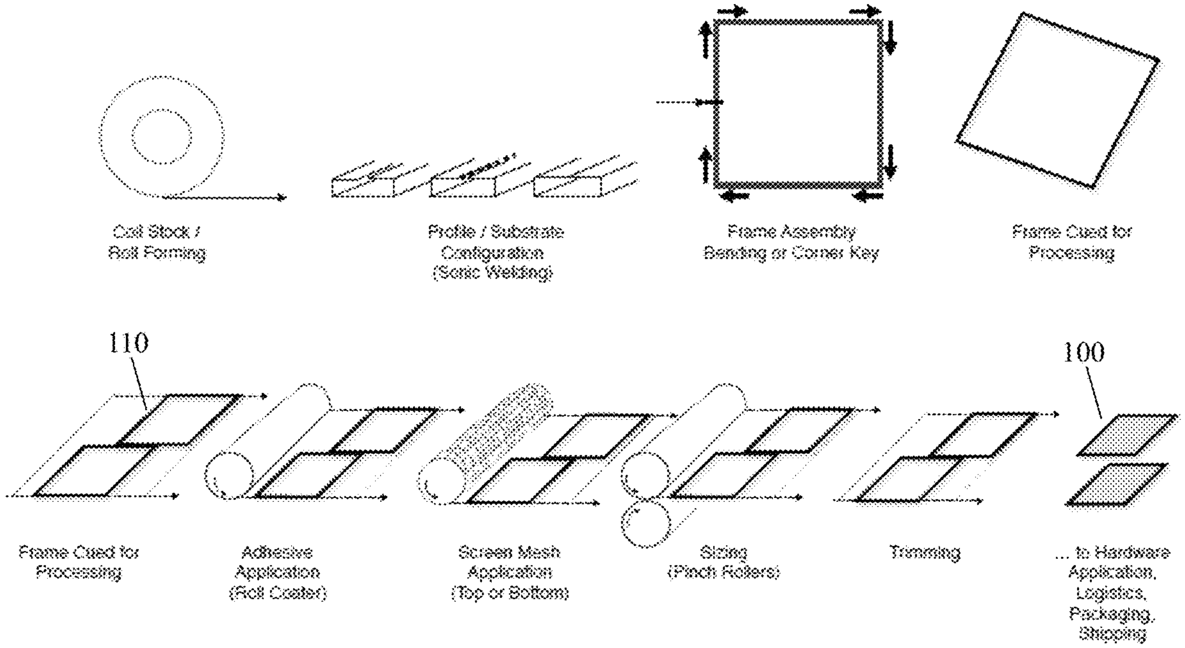
FIG. 6 illustrates an alternative series of steps for forming the frame of the reduced visibility screen shown in FIG. 1.

FIG. 6 illustrates an alternative series of steps for forming the frame of the reduced visibility screen 100, and which shows the pinch rollers being used. Note that one roller (or other device) may be used to press the mesh into the adhesive, with the opposite side of the frame of the screen being retained against and supported by a table or other rigid body.

FIG. 8 illustrates a side view of a reduced visibility screen 200 formed in accordance with a second embodiment of the present invention. The reduced visibility screen 200 may utilize a modified version of the screen 100 described hereinabove. The profile width of the reduced visibility screen 100 may typically be about ⅜ of an inch, and may be as small as 0.3 inches, which yields such a small confined internal space that does not readily accommodate a coil spring for biasing of a conventional plunger pin.

Therefore, the reduced visibility screen 100 may have a curved leaf spring secured thereto to create a reduced visibility screen 100'. In one embodiment, the leaf spring may have a curved shape, which curve may be an arc, a portion of an ellipse, a portion of a parabola, or any other suitable curve. In one embodiment, the leaf spring may be secured to holes formed in its frame. In another embodiment, the leaf spring 270 may have a first straight portion 271S between a first end 271 and a curved centrally positioned portion 270C, and a second straight portion 272S between a second end 272 and the centrally positioned curved portion, as shown in FIG. 11, which may better facilitate centering of the screen within a correspondingly shaped recess in the master window frame, as discussed hereinafter. The particular leaf spring arrangement utilized may be added not only to bias the screen within the master frame, but to also center the screen within a correspondingly shaped socket formed in a recess of the master frame. A single leaf spring, which may generally have a curved shape, may be suitably used on the frame. Alternatively, as shown in FIG. 8, two (or even more) such leaf springs may be installed thereon, and may be disposed towards opposite ends of one side of the frame (or may be equally spaced thereon or spaced as required/desired).

As shown in FIGS. 8-11, the outwardly disposed surface of one side of the reduced visibility screen 100 may have a first hole 201 and a second hole 202 formed therein, to create the reduced visibility screen 100', which holes 201/202 may be spaced a particular distance S1 apart. The leaf spring 270 may have a first end 271 and a second end 272, where the first end of the leaf spring may be formed with a first hook 271H, and the second end of the leaf spring may be formed with a second hook 272H. The leaf spring 270 may be formed with an overall length, as seen in FIG. 13B, being configured for the first hook 271H at the first end 271 of the leaf spring and the second hook 272H at the second end 272 of the leaf spring to be respectively received within the spaced apart first and second holes 201/202 in the one side of the narrow profile frame, when the leaf spring is deformed to be substantially straight. The overall length of leaf spring 270 may be selected so that when formed into its curved shaped, it may have a selective length S2, as seen in FIG. 12A, between the most distal interior positions of the hooks, so that the selective length S2 of the leaf spring may be configured for the first hook 271H and the second hook 272H to be selectively positioned with respect to the spaced apart first and second holes, when the leaf spring is undeformed (FIG. 13A). In one embodiment, the selective length S2 of the leaf spring may be slightly larger than the distance S1 (e.g., being 1% to 5% larger), such that the first hook 271H and the second hook 272H would not clamp-up onto the inside surfaces of the frame 100' formed by the two holes 201/202. In another embodiment, the selective length S2 of the leaf spring 270 may be substantially the same as the distance S1, such that the first hook 271H and the second hook 272H would each be immediately adjacent to the respective inside surfaces of the frame 100' formed by the two holes 201/202. In yet another embodiment, the selective length S2 of the leaf spring 270 may be slightly less than the distance S1 (e.g., S2 being 1% to 5% smaller than S1), such that the first hook 271H and the second hook 272H would each engage and clamp-up on the respective inside surfaces of the frame 100' formed by the two holes 201/202, when the deformed leaf spring is returned to its undeformed shape.

As the leaf spring is actuated from its undeformed position shown in FIG. 13A, during installation of the screen 200 into the socket of the master frame of the window/door, the ends 271/272 of the spring could tend to be drawn into the hollow interior of the frame 100', and could potentially be jammed therein with the spring remaining in a deformed position. Therefore, in another embodiment of the leaf spring, each of the hooks may be formed from a central portion of the end of the leaf spring raw material, leaving behind a pair of short straight sections on each end (e.g., 271Ri and 271Rii in FIG. 12B, and 271Ri and 272Rii in FIG. 12A). The pair of short straight sections on each end may contact the bottom surface of the frame 100', as seen in FIG. 9A, and may prevent the end of the leaf spring from being drawn into the hollow of the frame.

A variation of the screen 200 embodiment may also include at least one clip 290 secured to any of the four sides of the frame 100'. The clip 290 may wrap over the top of the frame and over the mesh material 280, and may have a return flange 291. The clip 290 may therefore be configured for handling of the screen 200 during installation into the master frame and removal therefrom.

Figure 14:
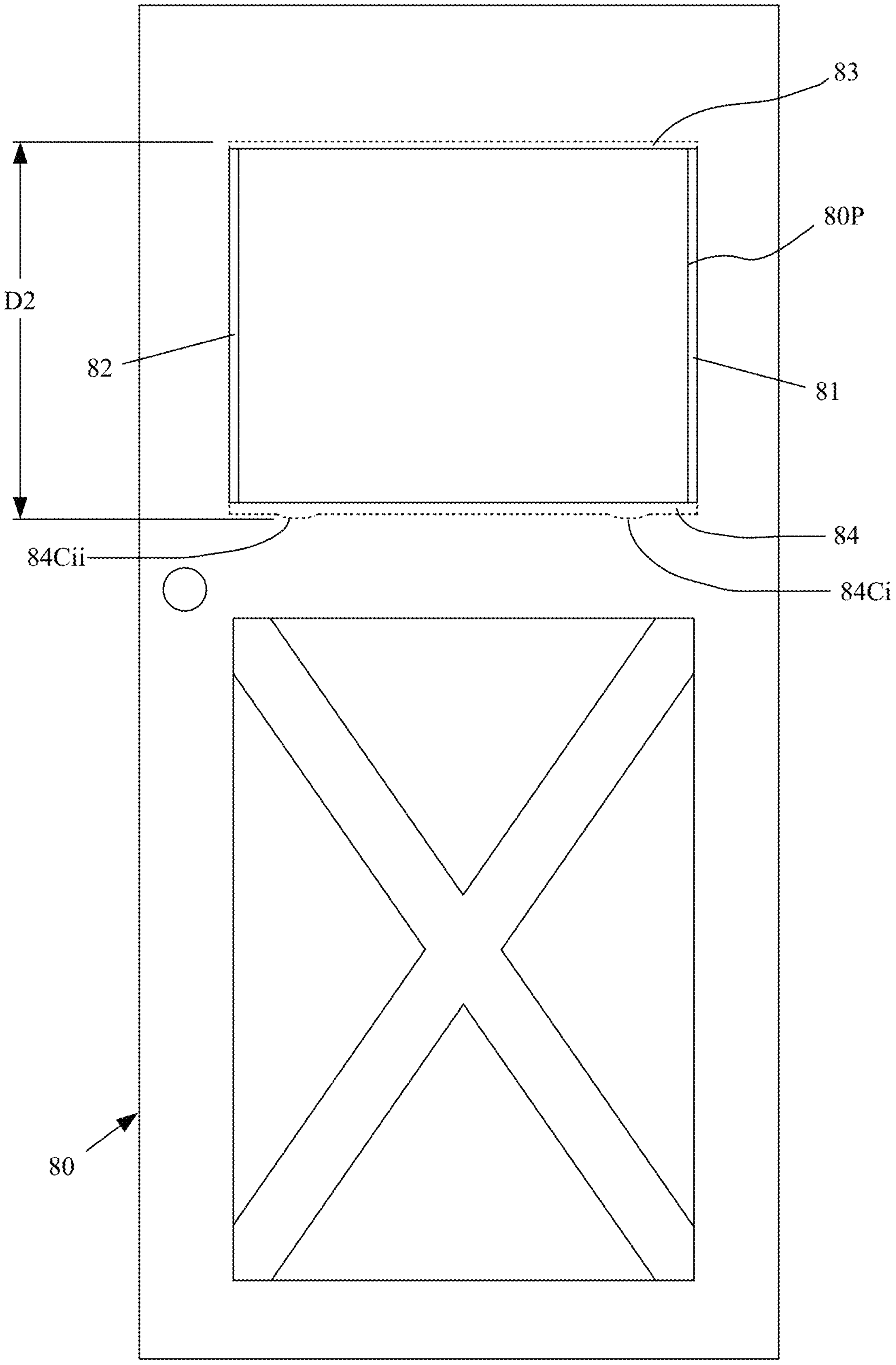
FIG. 14 is a side view of an interior side of a door with an opening formed therein that is configured to receive the reduced visibility screen of FIG. 8.

FIG. 14 is a side view of an interior side of an exemplary door 80 with an opening 80P formed therein, and being configured to receive the reduced visibility screen 200 of FIG. 8. The opening 80P may create in a pair of flanges 81/82 that may be initially contacted by the frame 100' as the screen 200 is installed into the socket (see FIG. 15A), and which flanges may subsequently provide support for two sides of the frame of the screen, after it is installed in the socket. The opening 80P may create an upper socket portion 83, and a lower socket portion 84, each having a selective depth related to the extent of the screen 200 (e.g., D2 shown in FIG. 14 for the socket may be slightly less than D1 shown in FIG. 8 for the corresponding screen extent, being at least one percent to ten percent less in one embodiment, and ten percent to twenty percent less in another embodiment). The lower socket portion 84 may also have a curved recess 84Ci formed therein that may generally correspond to the shape of the leaf spring 270 used on the screen 200, and may be appropriately positioned laterally in the lower socket 84 to suitably position/center the screen therein. Where two such leaf springs 270 may be used on screen 200, a pair of curved recesses 84Ci and 84Cii may be formed in the lower socket 84. In one embodiment, the simpler, curved leaf spring may be used. Where the plain curved leaf spring is used, the extreme edges of the curved recesses 84Ci and 84Cii may have an outside corner radius formed thereon, to prevent any tendency of the leaf spring to snag thereon. Also, for better centering, the radius of curvature of the leaf spring may preferably be formed to be within 10 percent of the radius of curvature of the curved recesses (84Ci and 84Cii). For better seating of the leaf spring in the recess, the radius of curvature of the curved recess is more preferably formed to be within 5 percent of the radius of curvature of the curved recesses. Seating may also be improved if the radius of curvature of the leaf spring is smaller than the radius of curvature of the corresponding recess. Lastly, for optimal seating, the radius of curvature of the curved recess is most preferably formed to be less than 3 percent larger than the radius of curvature of the leaf spring.

However, to assure even better centering of the frame, and movement of the leaf spring with respect to the curved recesses 84Ci and 84Cii, the leaf spring 270 formed with the first and second straight portion 271S and 272S on opposite sides of the curved central portion 270C may instead be used.

Figure 15A:
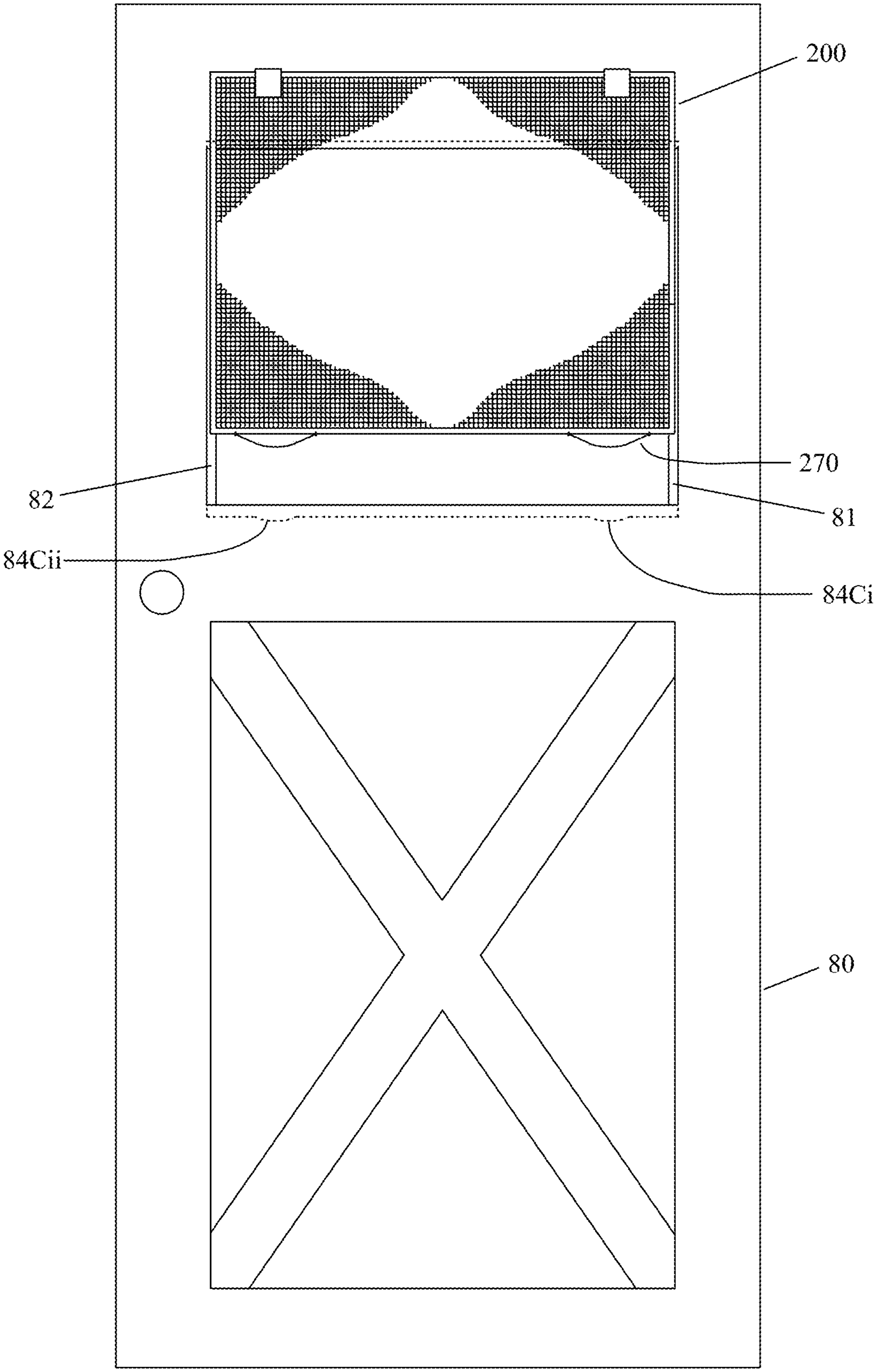
FIG. 15A illustrates the side view of the door of FIG. 14, with the reduced visibility screen of FIG. 8 in the process of being installed in the recess in the door.
Figure 15B:
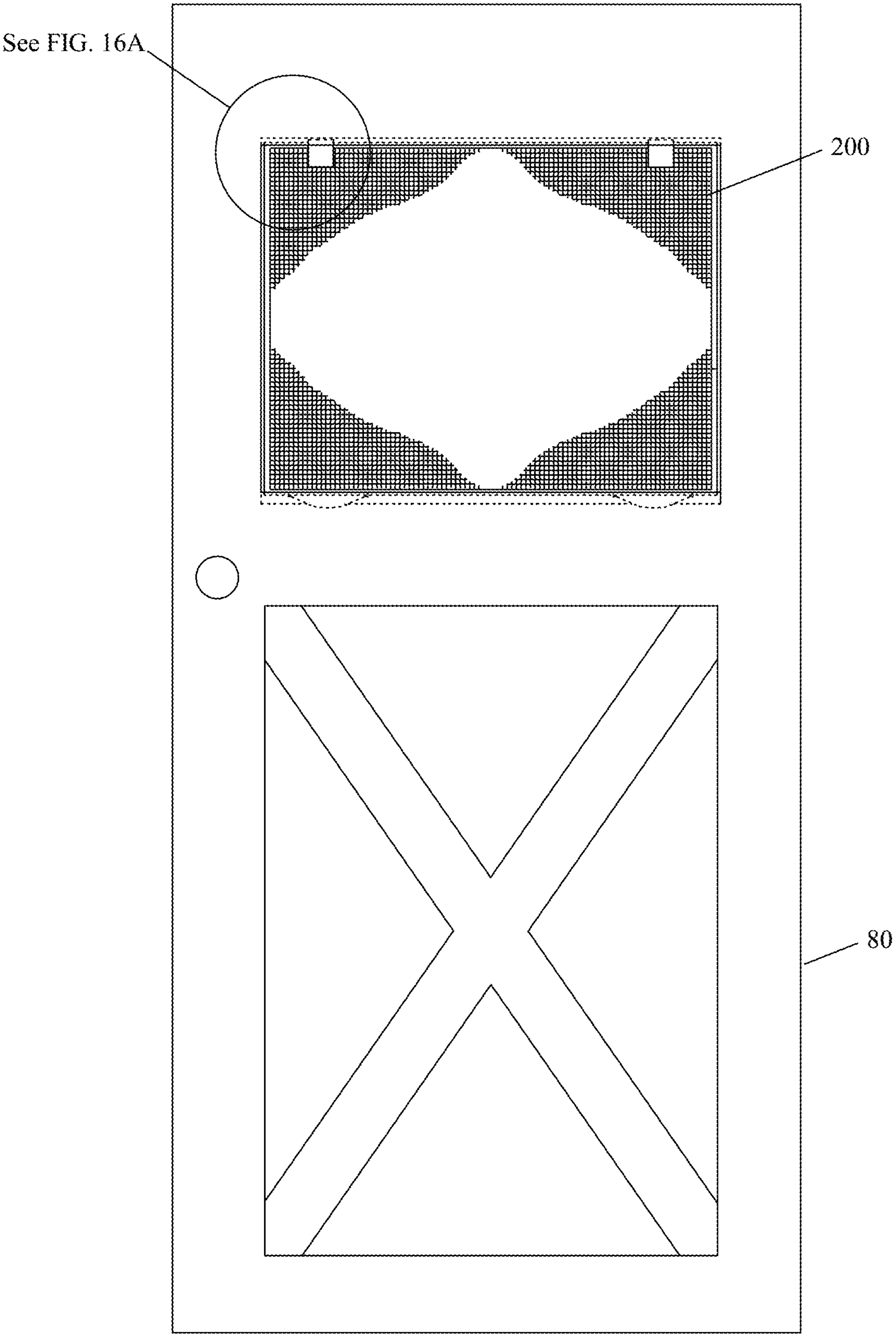
FIG. 15B is the side view of FIG. 15A, shown after the reduced visibility screen of FIG. 8 is installed in the recess in the door.

FIG. 15A illustrates the lower end of screen 200 being placed into contact with the flanges 81/82 of the frame of the door 80 (note that a door is used in the example merely to be exemplary, and installation into a master frame of window may proceed in a similar manner). As the screen 200 is lowered for its bottom end to enter the lower socket 84, the leaf spring(s) 270 would center the screen therein through contact with the curved recesses 84Ci and 84Cii. A force may be applied to the top end of the screen 200 to deform the leaf spring(s) 270 sufficiently to allow the top of the frame 100' to enter the opening, and once inserted therein, the springs may bias the top of the frame into contact with the upper surface of the upper socket 83, as shown in FIG. 15B, and the enlarged views of FIGS. 16A-16D. As seen in those figures, where a clip 290 is used, it would be in contact with the upper surface of the upper socket 83, and where a clip 290 is not used, the top of the frame 100' would instead be in contact with the upper surface of the upper socket 83.

Figure 16A:
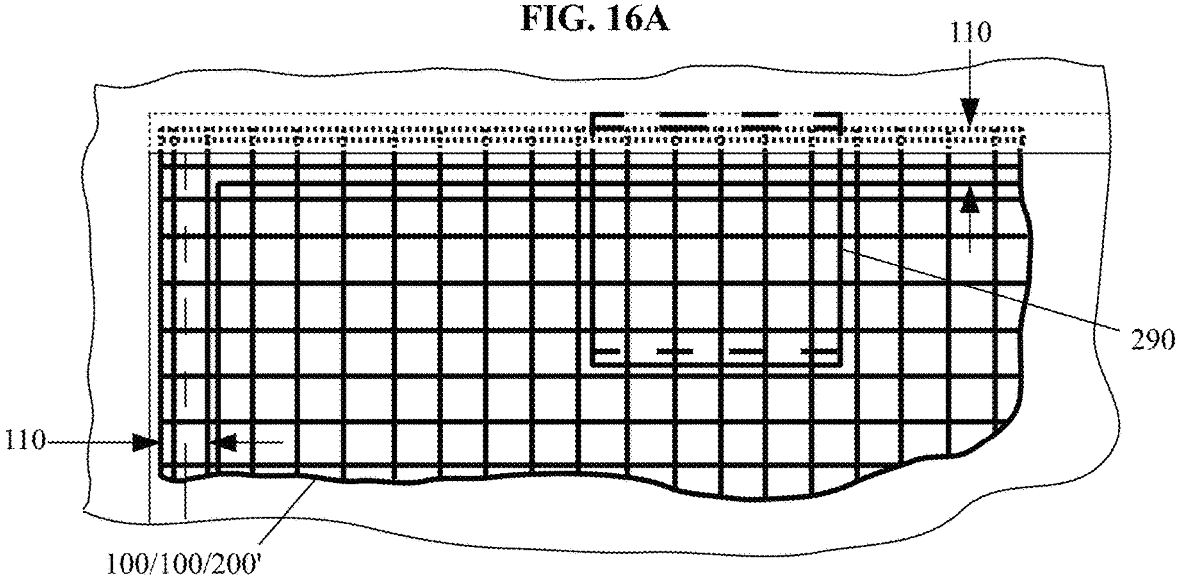
FIG. 16A is an enlarged detail view of one end of the reduced visibility screen installed within the door, as shown in FIG. 15B.
Figure 16B:
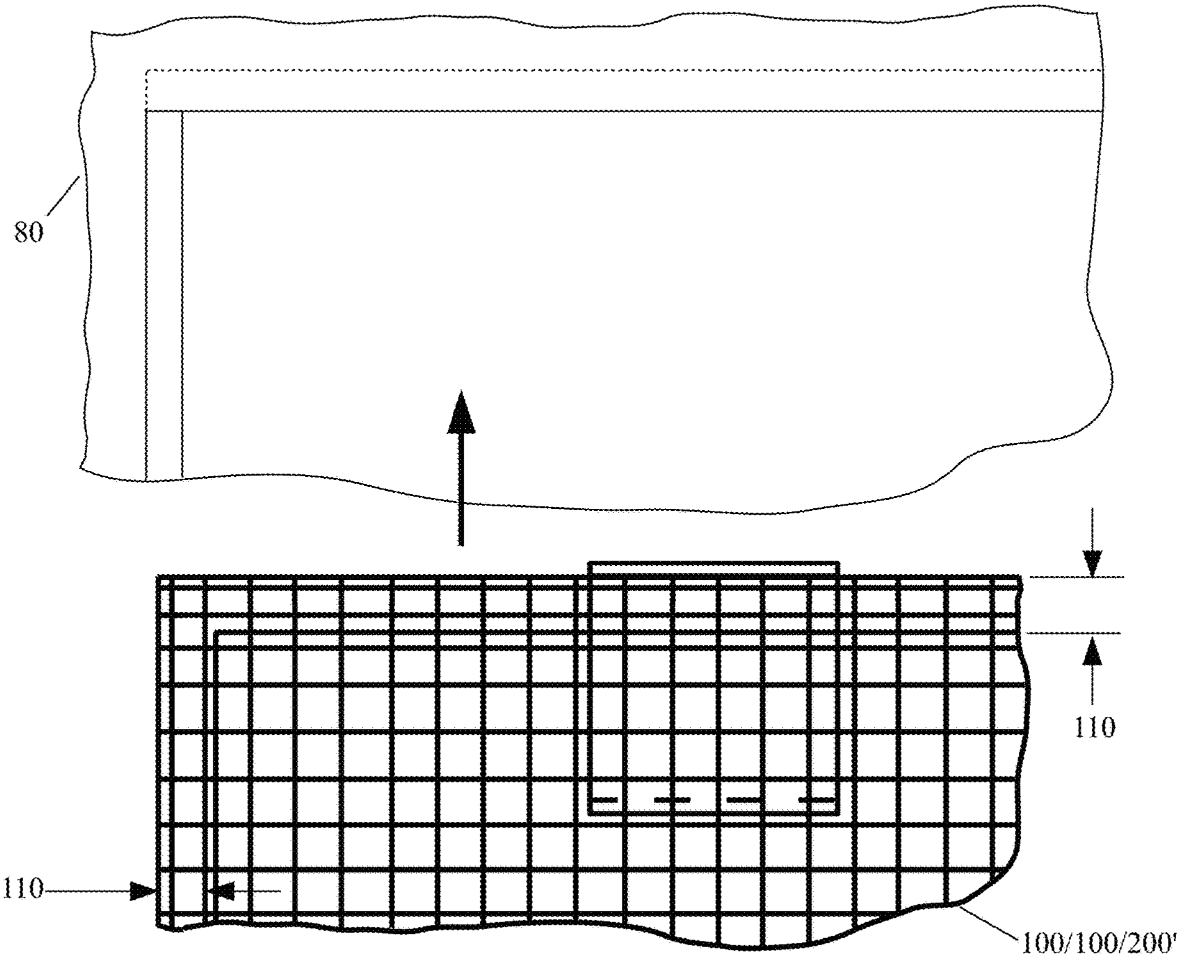
FIG. 16B is the enlarged detail view of FIG. 1, but is shown with the screen prior to installation into the door.
Figure 16C:
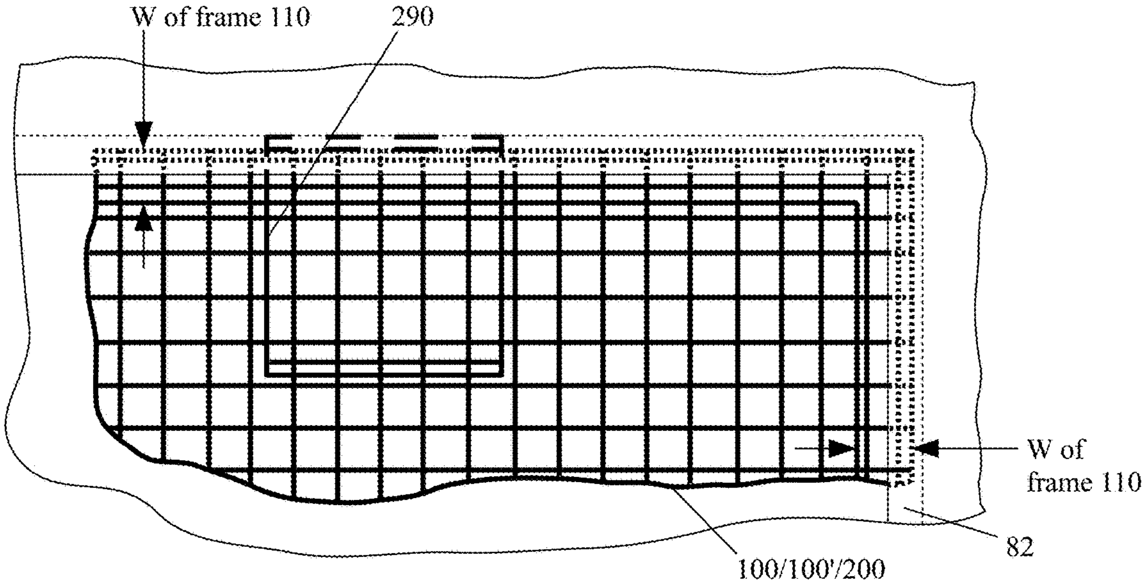
FIG. 16C is the enlarged detail view of FIG. 16A, but is mirrored to show the exterior facing side of the door and screen.

FIG. 16C is the enlarged detail view of the installed screen 200 shown in FIG. 16A, but shows the reverse, exterior facing side of the door and screen, and gives an indication of the reduced sightline described hereinabove produced by the combination of the reduced profile of the frame 100' and the particularly formed socket on the master frame of the door/window. The exposed portion of the reduced sightline frame 100' is indicated by the hatching 100H shown in FIG. 16D, which is otherwise the same as FIG. 16C.

The reduced sightline frame construction disclosed herein (e.g., frame 100, frame 100', etc.) is particularly devised to result in the width W of the frame (see FIG. 4) to be less than two times its depth D. In another embodiment, the width W of the frame is preferably less than 1.75 times the depth D, and in yet another embodiment, it is more preferably less than 1.5 times the depth D, and in yet a further embodiment the width W is most preferably about 66% of the depth D, as shown for the cross-section in FIG. 4J. When the frame (e.g., frame 100, frame 100', etc.) that is so constructed is inserted into the master frame of a corresponding door/window, the portion P of the narrow width W that is exposed beyond the master frame (see hatching 100H in FIG. 16D) is preferably less than three-quarters of that width W, and is more preferably less than one-half of that width W, and is most preferably less than one-quarter of the width W.

Figure 16D:
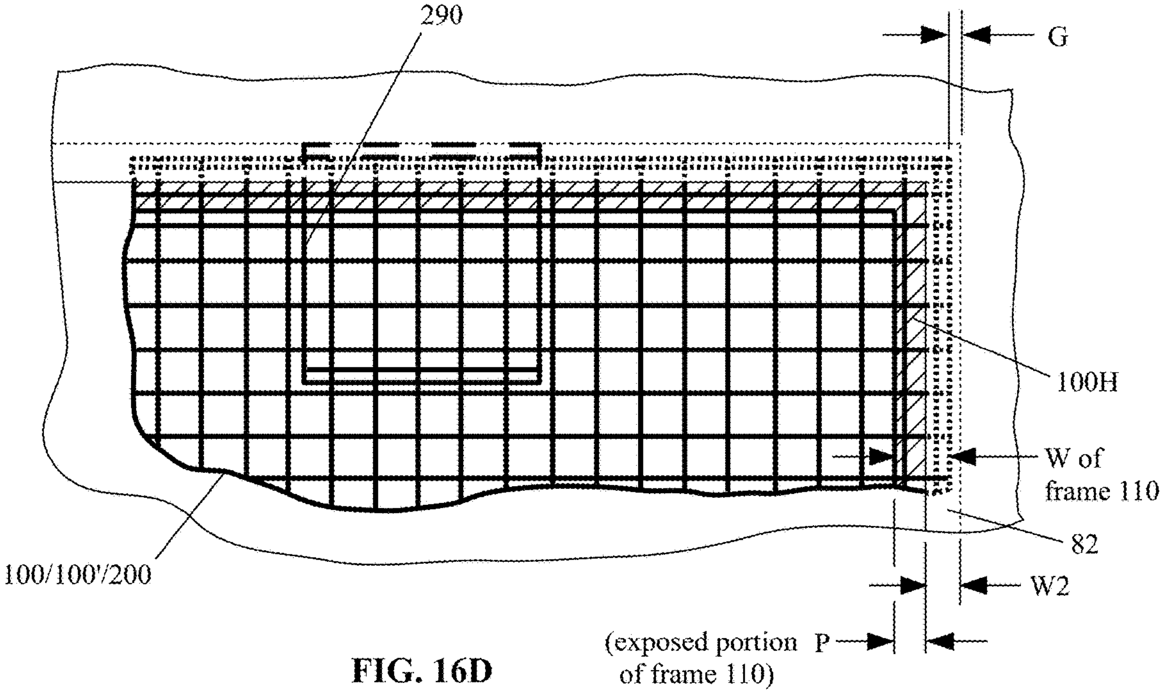
FIG. 16D is the detail view of FIG. 16C, but shows the exposed portion of the frame of the screen with hatching.

As seen in FIG. 16D, there may be a small gap G between each side of the frame 110 and the shoulder where the lateral flanges 81/82 begin, or in another embodiment there may be no gap at all (i.e., a slight friction fit may be formed therebetween).

The reduced sightline frame construction disclosed herein (e.g., frame 100, frame 100', etc.) is also particularly devised in combination with the master frame of the door/window to result in the width W of the frame to be less than two times the width W2 of the flange 81/82 (see FIG. 16D). In another embodiment, the width W of the frame is less than 1.75 times the width W2 of the flange 81/82, and in yet another embodiment it is less than 1.5 times the width W2 of the flange 81/82, and in yet a further embodiment the width W is about the same as the width W2 of the flange 81/82.

Figure 17:
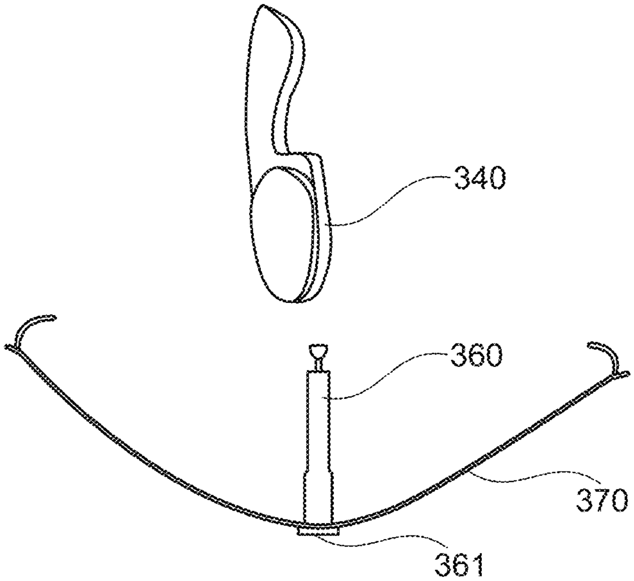
FIG. 17 is an exploded side view of a leaf spring, a plunger pin, and a handle member that may be movably secured to an end of the plunger pin, and which handle member has a cam surface selectively positioned thereon.
Figure 18:
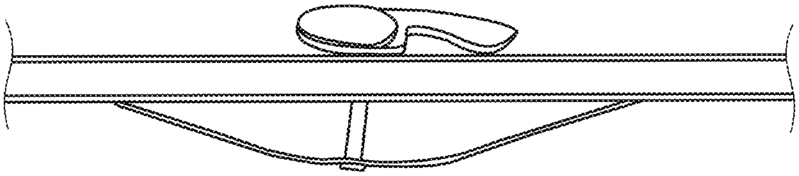
FIG. 18 shows a side view of the leaf spring, plunger pin, and handle of FIG. 17 after being assembled with respect to the frame of a reduced visibility screen formed in accordance with the present invention, and with the handle positioned for the leaf spring to be in an undeformed position.
Figure 19:
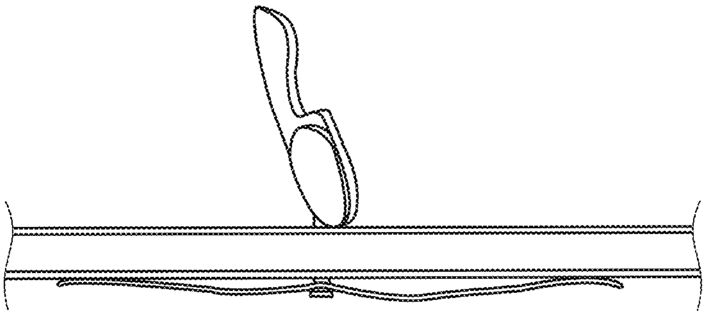
FIG. 19 is the side view of FIG. 18, but is shown with the handle member pivoted to deform the leaf spring to be substantially straightened.
Figure 20:
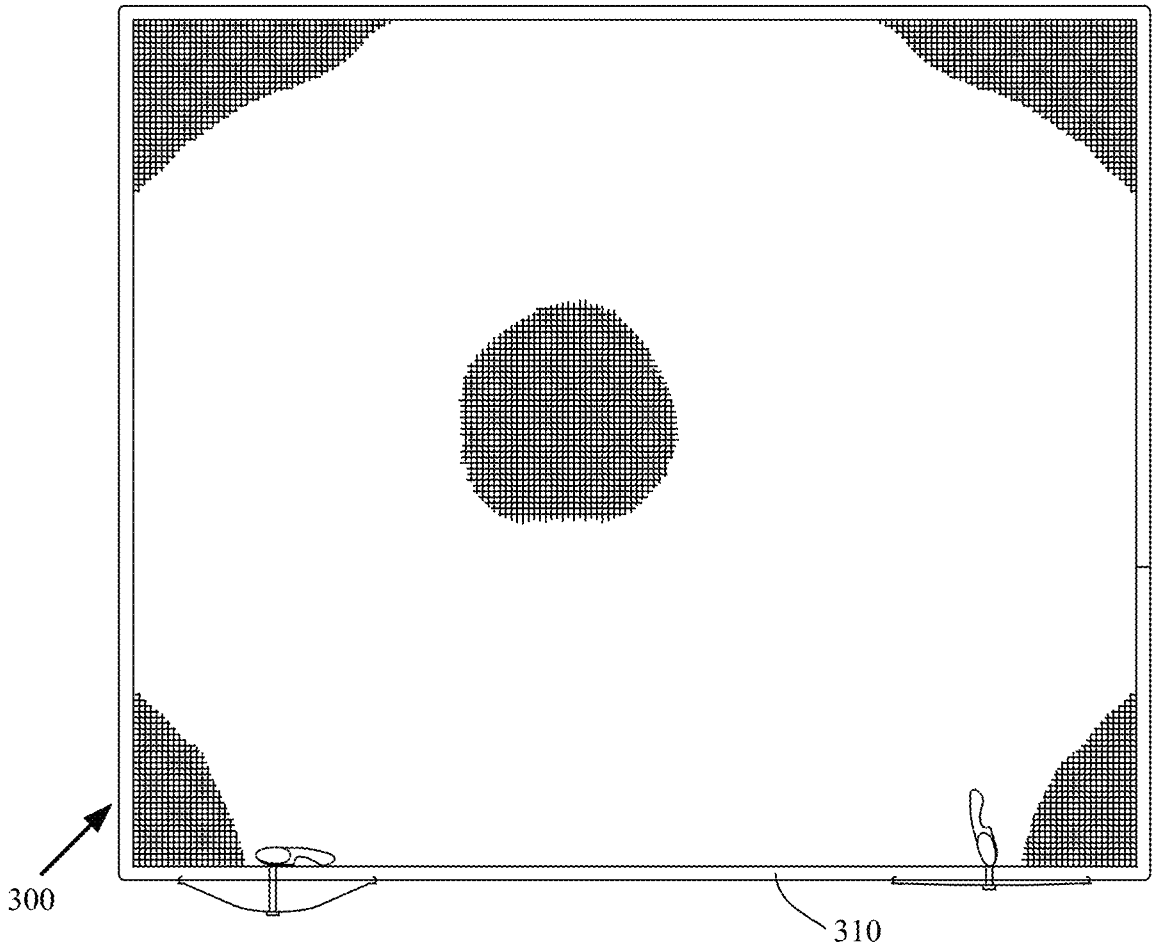
FIG. 20 is a side view showing two sets of leaf springs, plunger pins, and handles according to FIG. 17, after being assembled with respect to two portions of the frame of a reduced visibility screen in accordance with the present invention.

In yet another embodiment, a reduced sightline screen 300, shown in FIG. 20, may be formed from the screen 200, but which may also have a mechanical arrangement particularly designed for actuation of the leaf spring. FIG. 17 shows an exploded side view of the leaf spring 370, with a plunger pin 360 coupled thereto, and a handle member 340. One end of the plunger pin 360 may be secured to the leaf spring 370, in any suitable manner. It may be welded or otherwise permanently secured thereto. Alternatively, the plunger pin 360 may be formed with a head 361, and a hole may be formed at a central position of the leaf spring 370, so that the plunger pin may be fed through the hole until the head contacts the lower side of the leaf spring, as shown in FIG. 17. The narrow profile frame 310 may be formed the same as frame 100, except that it may also be formed with a third hole being formed substantially mid-way between the first and second holes 201/202. The leaf spring 370 with plunger pin 360 coupled thereto may be installed on the frame 310 by inserting the free end of the plunger pin through the third hole, and by coupling the handle 340 to the exposed end of the pin. The handle member 340 may be movably secured to the upper end of the plunger pin 360, and the handle member may have a cam surface for particular contact with one side of the frame 310. As seen in FIGS. 18-19 and in FIG. 20, the handle member 340 may be movable between first and second positions using the cam surface to actuate the plunger pin to respectively move the leaf spring between being deformed and undeformed. The cam surface of the handle member 340 may be configured to hold the leaf spring 370 in the deformed position shown in FIG. 19 without being maintained thereat by the user. With the handle member 340 actuated to be maintained in the deformed (i.e., straightened position), the screen 300 may be more easily removed from the socket of the master frame of the window/door.

Figure 21:
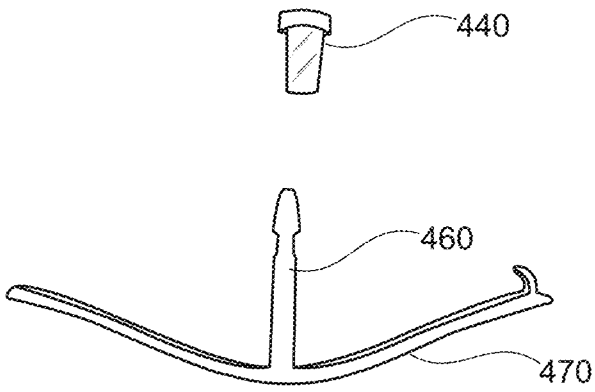
FIG. 21 illustrates an exploded view of an alternate embodiment of the leaf spring, plunger pin, and handle member of FIG. 17.

FIG. 21 illustrates an exploded view of an alternate embodiment, which includes a leaf spring member 470 and a plunger pin 460 that are formed as a single unitary part, and handle member 440 that may be threadably attached to the plunger pin to be rotated to actuate the leaf spring between its deformed and undeformed positions.

Figure 22:
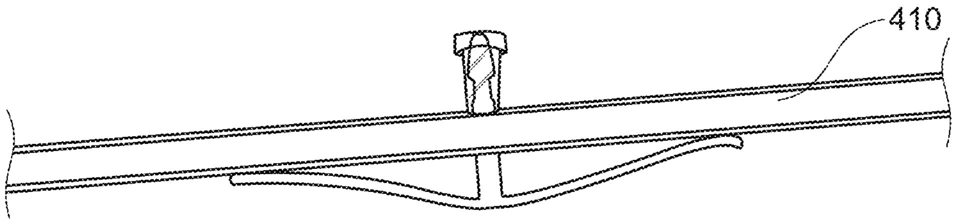
FIG. 22 illustrates the alternate embodiment of the leaf spring, plunger pin, and handle member of FIG. 21, after being assembled with respect to the frame of a reduced visibility screen formed in accordance with the present invention, and with the handle positioned for the leaf spring to be in an undeformed position.

FIG. 22 illustrates the alternate embodiment of the leaf spring/plunger pin combination 470/460, and handle member 440 of FIG. 21, after being assembled with respect to the frame 410 of a reduced visibility screen formed in accordance with the present invention, and with the handle positioned for the leaf spring to be in an undeformed position.

Figure 23:
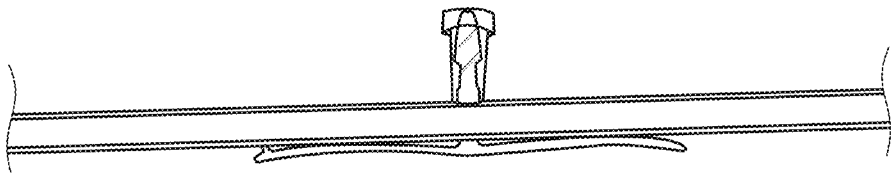
FIG. 23 illustrates the side view of FIG. 22, but is shown with the handle member moved to deform the leaf spring to be substantially straightened.

FIG. 23 illustrates the side view of FIG. 22, but is shown with the handle member 440 moved to deform the leaf spring to be substantially straightened.

Figure 24:
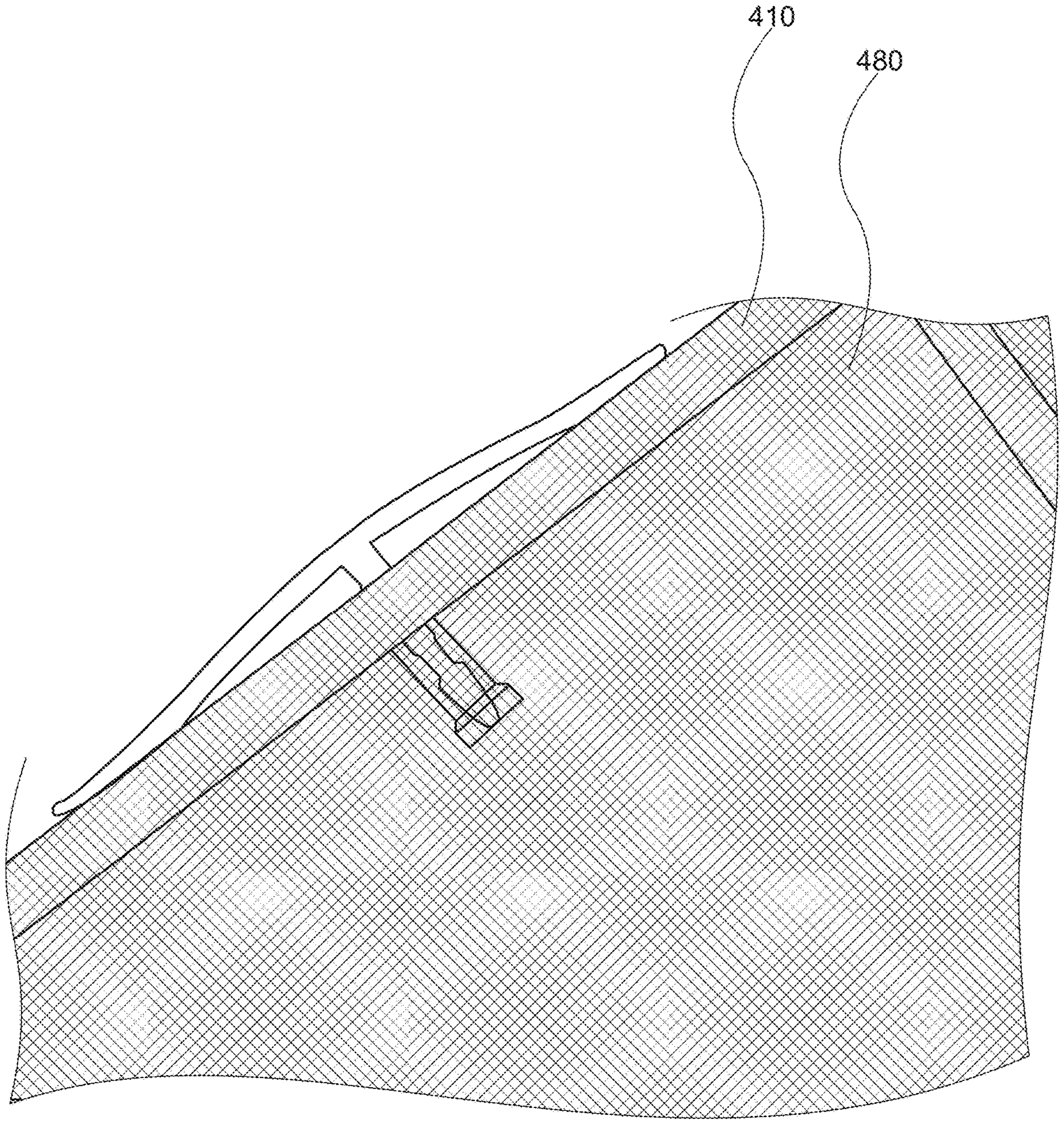
FIG. 24 illustrates the side view of FIG. 22, but is shown with mesh material applied onto the frame.

FIG. 24 illustrates the side view of FIG. 22, but is shown with mesh 480 material applied onto the frame 410.

FIG. 25 is an exploded view showing the component parts for a helical spring biased plunger pin arrangement, including a frame 501, a plunger 502, a cap 503, and the spring 504.

FIG. 26 is an enlarged side view of the plunger 502 shown in FIG. 25.

FIG. 27 is an end view of the plunger 502 of FIG. 26.

FIG. 28 is a cross-sectional view through the plunger 502 of FIG. 26.

FIG. 29 shows the component parts of FIG. 25 assembled to form the plunger pin arrangement, being shown with the plunger pin in the extended position.

FIG. 30 is the plunger pin arrangement of FIG. 29, but is shown with the plunger pin in the extended position.

FIG. 31 is a side view of a pull tab 505 usable with the reduced visibility screen shown in FIG. 1 and FIG. 3.

FIG. 32 is an end view of the pull tab 505 of FIG. 31.

FIG. 33 is a bottom view of the pull tab 505 of FIG. 31.

FIG. 34 is a side view showing the pull tab 505 of FIG. 31 installed within the frame of a reduced visibility screen in accordance with the present invention.

FIG. 35 is a cross-sectional view through the pull tab 505 and frame, as shown in FIG. 34.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A combination screen and corresponding socket in a master frame of a window or door, a portion of said screen configured to be received in said socket;

wherein said screen comprises:

a frame;

a mesh applied to side surfaces of said frame; and a first leaf spring and a second leaf spring, wherein at least a central portion of each said leaf spring is curved and comprises a radius of curvature, and each end of each said leaf spring is secured to a bottom side of said frame;

wherein the master frame comprises:

a first stile section, an upper rail section, a second stile section, and a lower rail section joined together;

wherein said socket comprises:

an upper socket formed in said upper rail section; and a lower socket formed in said lower rail section;

wherein said lower socket in said lower rail section comprises:

a first curved recess formed within a first portion of said lower socket and being formed by a first continuous curved surface;

a second curved recess formed within a second portion of said lower socket and being formed by a second continuous curved surface; and wherein each of said first curved recess and said second curved recess comprises: a radius of curvature;

wherein said curved central portion of said first leaf spring is received in said first curved recess of said lower socket, and said curved central portion of said second leaf spring is received in said second curved recess of said lower socket; and wherein said radius of curvature of each said curved recess is in a range between being sized the same as, and being sized less than three percent larger than, said radius of curvature of each said leaf spring, to thereby bias and position said frame in the vertical direction with respect to said lower socket in said lower rail section, and to also center said frame in the horizontal direction with respect to said first stile section and said second stile section of the master frame, to provide a uniform appearance.

2. The combination screen and corresponding socket for a master frame of a window or door according to claim 1, further comprising at least one clip secured to any one of the side surfaces of said frame, said clip comprising:

a first flange, a second flange, a third flange, and a return flange; said first flange, said second flange, and said return flange configured to form a rectangular-shaped opening being configured for any one of said side surfaces of said frame to nest therein;

said third flange and said return flange of said at least one clip configured for handling of said screen during installation into the master frame and during removal therefrom.

3. The combination screen and corresponding socket for a master frame of a window or door according to claim 1, wherein said mesh extends to distal ends of the side surfaces of said frame; and wherein said screen further comprises: an adhesive applied to said side surfaces of said frame, and said mesh being applied to said adhesive on said side surfaces.

4. The combination screen and corresponding socket for a master frame of a window or door according to claim 3, wherein said adhesive comprises a marine adhesive.

5. The combination screen and corresponding socket for a master frame of a window or door according to claim 3, wherein said adhesive comprises a hot melt adhesive.

6. The combination screen and corresponding socket for a master frame of a window or door according to claim 3, wherein said frame is formed from a single elongated cross-sectional member having a first end and a second end, and being bent at multiple corners to form a multiple-sided frame and to position said first end adjacent to said second end; and wherein said first end is fixedly secured to said second end.

7. The combination screen and corresponding socket for a master frame of a window or door according to claim 6, wherein said first end of said frame is welded to said second end of said frame.

8. The combination screen and corresponding socket for a master frame of a window or door according to claim 6, wherein said first end of said frame is sonically welded to said second end of said frame.

9. The combination screen and corresponding socket for a master frame of a window or door according to claim 6, wherein said first end of said frame is laser welded to said second end of said frame.

10. The combination screen and corresponding socket for a master frame of a window or door according to claim 1, wherein said bottom side of said frame is formed with a first pair of holes, and a second pair of holes;

wherein each said leaf spring comprises: a first end and a second end, with said first end formed with a first hook, and said second end formed with a second hook;

wherein each of said first hook and said second hook comprise: a semicircular-shaped hook;

wherein said first end of each said leaf spring comprises: a flat protrusion configured to extend beyond said semicircular-shaped hook at said first end;

wherein said second end of each said leaf spring comprises: a flat protrusion configured to extend beyond said semicircular-shaped hook at said second end;

wherein said first and second hooks of said first leaf spring are configured to be respectively secured to said first pair of holes, whereat said flat protrusion at said first end and said flat protrusion at said second end of said first leaf spring have a length configured to contact a respective adjacent bottom surface of said frame to prevent an entirety of each of said first end and said second end of said first leaf spring from being drawn into a respective one of said first pair of holes, when a central portion of said first leaf spring is deformed to be in contact with said bottom surface of frame; and wherein said first and second hooks of said second leaf spring are configured to be respectively secured to said second pair of holes, whereat said flat protrusion at said first end and said flat protrusion at said second end of said second leaf spring have a length configured to contact a respective adjacent bottom surface of said frame to prevent an entirety of each of said first end and said second end of said second leaf spring from being drawn into a respective one of said second pair of holes, when a central portion of said second leaf spring is deformed to be in contact with said bottom surface of frame; and wherein each of said first leaf spring and said second leaf spring comprise a length configured to position its respective first and second semicircular-shaped hooks to contact respective inside surfaces of the corresponding said pair of holes, when each of said first and second leaf springs are undeformed.

11. The combination screen and corresponding socket for a master frame of a window or door according to claim 1, wherein said frame comprises a narrow profile frame, wherein said narrow profile of said frame comprises a width that is less than two times its depth.

* * * * *